United States Patent
Ryu et al.

(10) Patent No.: US 11,720,317 B2
(45) Date of Patent: Aug. 8, 2023

(54) ELECTRONIC DEVICE AND METHOD FOR CONTROLLING BUFFER

(71) Applicant: Samsung Electronics Co., Ltd., Gyeonggi-do (KR)

(72) Inventors: Kyusang Ryu, Gyeonggi-do (KR); Gupil Cheong, Gyeonggi-do (KR); Sanghyeok Sim, Gyeonggi-do (KR); Sungjun Choi, Gyeonggi-do (KR); Doosuk Kang, Gyeonggi-do (KR); Seongmin Je, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 17/171,165

(22) Filed: Feb. 9, 2021

(65) Prior Publication Data

US 2021/0247950 A1  Aug. 12, 2021

(30) Foreign Application Priority Data

Feb. 10, 2020  (KR) .................. 10-2020-0015956

(51) Int. Cl.

| | |
|---|---|
| H04B 3/00 | (2006.01) |
| G06F 3/16 | (2006.01) |
| G10L 19/00 | (2013.01) |
| H04W 76/14 | (2018.01) |
| H04W 4/80 | (2018.01) |
| H04B 3/54 | (2006.01) |
| H04R 1/08 | (2006.01) |
| H04R 1/10 | (2006.01) |

(52) U.S. Cl.
CPC .............. *G06F 3/162* (2013.01); *G10L 19/00* (2013.01); *H04B 3/54* (2013.01); *H04R 1/08* (2013.01); *H04R 1/1016* (2013.01); *H04R 1/1025* (2013.01); *H04R 1/1041* (2013.01); *H04W 4/80* (2018.02); *H04W 76/14* (2018.02); *H04R 2420/07* (2013.01)

(58) Field of Classification Search
CPC ........................... H04B 3/00; H04R 2227/005
USPC ........................................................ 381/77
See application file for complete search history.

(56) References Cited

U.S. PATENT DOCUMENTS

| | | |
|---|---|---|
| 6,459,696 B1 | 10/2002 | Carpenter et al. |
| 7,286,562 B1 | 10/2007 | Vargo et al. |
| 2012/0230510 A1 | 9/2012 | Dinescu et al. |
| 2013/0222699 A1 | 8/2013 | Wang et al. |
| 2015/0295982 A1 | 10/2015 | Kafle et al. |
| 2017/0026780 A1 | 1/2017 | Ryu |
| 2019/0373490 A1 | 12/2019 | Rahmati et al. |

FOREIGN PATENT DOCUMENTS

| | | |
|---|---|---|
| CN | 108551358 A | 9/2018 |
| KR | 10-2010-0039535 A | 4/2010 |
| WO | 2021/145659 A1 | 7/2021 |

OTHER PUBLICATIONS

International Search Report dated May 21, 2021.
European Search Report dated Dec. 20, 2022.

*Primary Examiner* — George C Monikang
(74) *Attorney, Agent, or Firm* — Cha & Reiter, LLC

(57) ABSTRACT

According to certain embodiments, an electronic device comprises a communication circuit, a memory including a buffer configured to store audio data received from an external electronic device via the communication circuit, an audio output circuit, and a processor electrically connected to the communication circuit, the memory, and the audio output circuit.

20 Claims, 13 Drawing Sheets

ELECTRONIC DEVICE AND METHOD FOR CONTROLLING BUFFER

CROSS-REFERENCE TO RELATED APPLICATION(S)

This application is based on and claims priority under 35 U.S.C. § 119 to Korean Patent Application No. 10-2020-0015956, filed on Feb. 10, 2020, in the Korean Intellectual Property Office, the disclosure of which is incorporated by reference herein in its entirety.

BACKGROUND

Field

Certain embodiments relate to an electronic device and method for controlling a buffer of a wireless communication device.

Description of Related Art

Users may access a variety of media while carrying electronic devices. These electronic devices may be connected to external devices by using wireless network technologies that provide extended functions.

SUMMARY

According to certain embodiments, an electronic device comprises a communication circuit, a memory including a buffer configured to store audio data received from an external electronic device via the communication circuit, an audio output circuit, and a processor electrically connected to the 25 communication circuit, the memory, and the audio output circuit, wherein the processor is configured to: control the communication circuit to connect to the external electronic device with a first communication scheme; process pulse code modulation (PCM) samples obtained by decoding audio data output from the buffer with a first number of PCM samples, and control the audio output circuit to output the PCM samples which are processed, with the first number of PCM samples; in response to receiving a request for adjusting a size of the buffer from the external electronic device, change a processing number of PCM samples from the first number of PCM samples to a second number of PCM samples; in response to the change in the processing number of PCM samples to the second number of PCM samples, process PCM samples obtained by decoding the audio data output from the buffer, with the second number of PCM samples while the size of the buffer is adjusted, and control the audio output circuit to output the PCM samples which are processed with the second number of PCM samples; and when the size of the buffer being adjusted reaches a designated buffer size, process PCM samples obtained by decoding the audio data output from the buffer, with the first number of PCM samples, and control the audio output circuit to output the PCM samples which are processed with the first number of PCM samples.

According to certain embodiments, an electronic device, comprises a communication circuit; a memory; an audio processing circuit; and a processor electrically connected to the communication circuit, the memory, and the audio processing circuit, wherein the processor is configured to: control the communication circuit to connect to an external electronic device using a first communication scheme; control the audio processing circuit to process pulse code modulation (PCM) samples for an audio source with the first number of the PCM samples; control the communication circuit to transmit, to the external electronic device, audio data which is generated by encoding PCM samples which are processed with the first number of PCM samples; in response to identifying occurrence of an event for controlling a buffer of the external electronic device, control the audio processing circuit to process the PCM samples for the audio source with a second number of PCM samples; control the communication circuit to transmit, to the external electronic device, audio data which is generated by encoding PCM samples which are processed with the second number of PCM samples; and when identifying that a size of the buffer of the external electronic device being adjusted reaches a designated buffer size, control the communication circuit to transmit, to the external electronic device, audio data which is generated by encoding PCM samples which are processed with the first number of PCM samples.

According to certain embodiments, a method for controlling a buffer in an electronic device comprises: connecting to an external electronic device using a first communication scheme; storing audio data received from the external electronic device in a buffer; processing pulse code modulation (PCM) samples with a first number of the PCM samples, and outputting the PCM samples which are processed with the first number, the PCM samples are obtained by decoding audio data output from the buffer; in response to receiving a request for adjusting a size of the buffer from the external electronic device, changing a processing number of PCM samples from the first number of PCM samples to a second number of PCM samples; in response to the change in the processing number of PCM samples to the second number of PCM samples, processing PCM samples which are obtained by decoding audio data outputted from the buffer with the second number of PCM samples while the size of the buffer is adjusted, and outputting the PCM samples which are processed with the second number of PCM samples; and when the size of the buffer being adjusted reaches a designated buffer size, processing PCM samples which are obtained by decoding audio data outputted from the buffer with the first number of PCM samples, and outputting the PCM samples which are processed with the first number of PCM samples.

DETAILED DESCRIPTION

Electronic devices may use a Bluetooth network technology as one of a variety of wireless network interfaces. The Bluetooth network technology may include a Bluetooth legacy (or classic) network technology or a Bluetooth low energy (BLE) network, and may include a topology of various connection forms such as a piconet and a scatternet. External wireless communication devices may be wirelessly connected to electronic devices using such Bluetooth technology. Audio data for contents that are played (or reproduced) in the electronic devices may be transmitted to the external wireless communication devices. The audio data may be processed in the external wireless communication devices and be outputted to users.

In a case that audio data is processed in an electronic device which is based on a Bluetooth technology, a buffer size of the electronic device is fixed. Accordingly, if the buffer size of the electronic device is large, latency is high, so delay may occur when audio data for contents such as a live event is processed.

If the size of the buffer of the electronic device is small, the latency is small, but sound interruption may occur frequently when users listen to contents such as music. Even if the size of the buffer is changed to an appropriate size depending on a used scenario, a mute state may temporarily occur while the size of the buffer is reset.

An electronic device and method for controlling a buffer of a wireless communication device as described in this document may alleviate the foregoing problem.

Hereinafter, an electronic device according to certain embodiments will be described with reference to the accompanying drawings.

Figure 1:
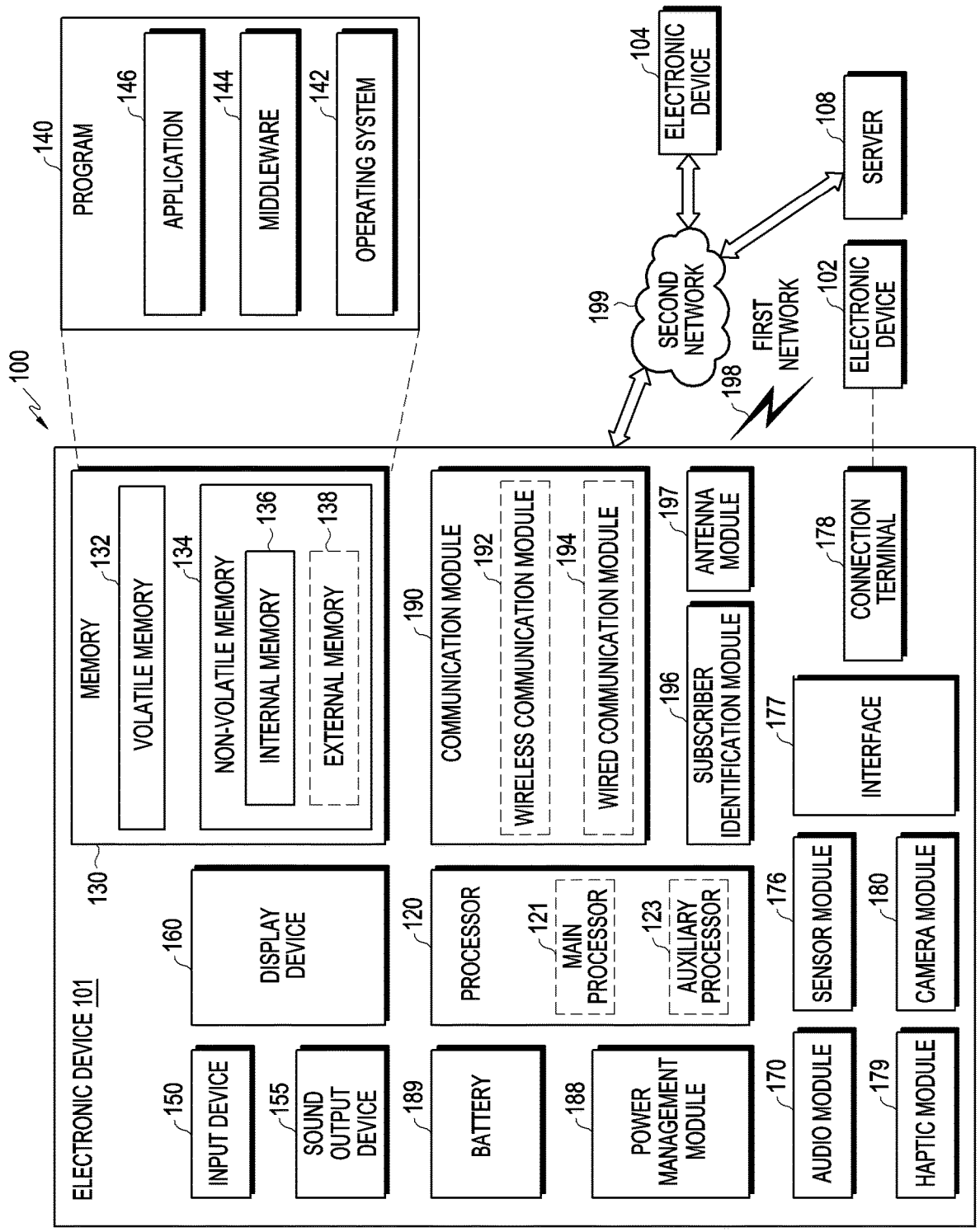
FIG. 1 is a diagram illustrating a network environment according to an embodiment.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 may use a Bluetooth network technology as one of a variety of wireless network interfaces to wirelessly connect to external electronic devices, such as external electronic device 102. The electronic device 100 may transmit audio data to the external electronic device 102.

Figure 2:
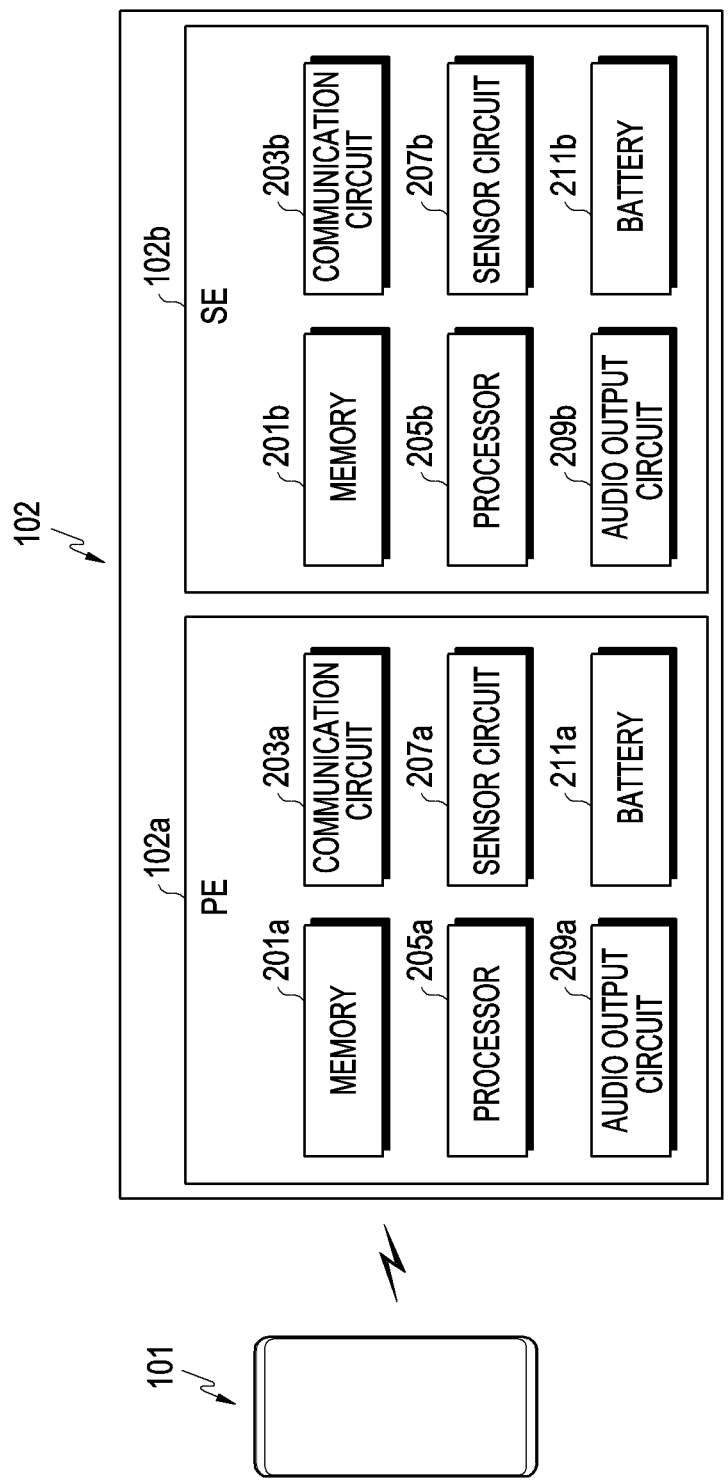
FIG. 2 is a diagram illustrating an example of a structure of an electronic device and an external electronic device according to an embodiment.

When audio data is processed in electronic device 101 based on Bluetooth technology, a buffer size of the electronic device in the memory 130 can be fixed. Accordingly, if the buffer size of the electronic device is large, latency is high, so delay may occur when audio data for contents such as a live event is processed. If the size of the buffer of the electronic device is small, the latency is small, but sound interruption may occur frequently when users listen to contents such as music. When the size of the buffer is changed to an appropriate size depending, a mute state may be avoided while the size of the buffer is reset. FIG. 2 is a diagram illustrating an example of a structure of an electronic device and an external electronic device according to an embodiment.

Referring to FIGS. 1 and 2, an external electronic device 102 according to an embodiment may communicate with an electronic device 101 with a first communication scheme (e.g., a Bluetooth communication). For example, the external electronic device 102 may be an accessory device such as an earphone or an ear bud. For example, the electronic device 101 and the external electronic device 102 may be configured as an audio source device and an audio sink device, respectively.

For example, the external electronic device 102 may be configured to include a primary device 102a and a secondary device that are physically separated from each other, but communicate with each other. The primary device 102a and the secondary device 102b may communicate with each other by using the first communication scheme. As another example, the external electronic device 102 may be configured as a single device without being divided into the primary device 102a and the secondary device 102b. For example, the primary device 102a may be a right ear bud and the secondary device 102b may be a left ear bud.

The primary device 102a of the external electronic device 102 may include a memory 201a, a communication circuit 203a, a processor 205a, a sensor circuit 207a, an audio output circuit 209a (e.g., speaker), and a battery 211a. The secondary device 102b of the external electronic device 102 may include a memory 201b, a communication circuit 203b, a processor 205b, a sensor circuit 207b, an audio output circuit 209b (e.g., speaker), and a battery 211b. The primary device 102a and the secondary device 102b of the external electronic device 102 may store address information of each other, and may be connected to each other by using the stored address information.

The primary device 102a and the secondary device 102b may be configured as a device which performs a master role and a device which performs a slave role, respectively. The primary device 102a may perform the master role according to a communication between the primary device 102a and the secondary devices 102b. The primary device 102a may transmit a data packet received from the electronic device 101 to the secondary device 102b. The secondary device 102b may perform the slave role according to the communication, and may receive the data packet from the primary device 102a. In an example, the secondary device 102b may receive a data packet from the electronic device 101 and then transmit the data packet to the primary device 102a. The packet data may include audio data and/or related information for processing the audio data. The primary device 102a may be synchronized with the secondary device 102b to process the audio data. In certain embodiments, the audio data can include presentation time stamps indicating the time that the audio data should be converted to sound. For another example, according to a subject connected to the electronic device 101, the primary device 102a may be configured as a device which performs the slave role, and the secondary device 102b may be configured as a primary device which performs the master role.

When the external electronic device 102 is configured as a single device without being divided into the primary device 102a and the secondary device 102b, the external electronic device 102 may include the same components as the memory 201a, the communication circuit 203a, the processor 205a, the sensor circuit 207a, the audio output circuit 209a, and the battery 211a included in the primary device 102a.

The external electronic device 102 may connect the primary device 102a to the electronic device 101 via, for example, the first communication scheme, and the primary device 102a may transmit, to the secondary device 102b, audio data and related information for processing the audio data which are received by the electronic device 101. The secondary device 102b may process the same operation as the primary device 102a as the secondary device 102b receives, from the primary device 102a, the received audio data and related information for processing the audio data.

If the primary device 102a receives a request for adjusting a buffer size from the electronic device 101, the primary device 102a may transmit related information to the secondary device 102b so that the primary device 102a is synchronized with a buffer of the secondary device 102b and adjust the buffer size. For another example, the external electronic device 102 may communicate with the electronic device 101 by using the first communication scheme via the secondary device 102b, and the secondary device 102b may transmit, to the primary device 102a, audio data and related information for processing the audio data which are received by the electronic device 101.

For still another example, the external electronic device 102 may communicate with the electronic device 101 via both the primary device 102a and the secondary device 102b. For example, the primary device 102a may communicate with the electronic device 101 via the first communication scheme. The secondary device 102b may receive or monitor audio data and related information for processing the audio data which are transmitted and received between the primary device 102a and the electronic device 101 based on information about the first communication scheme which is received from the primary device 102a.

For example, the received information about the first communication scheme may include address information or clock information of the electronic device 101. The secondary device 102b may receive the same data packet as a data packet received by the primary device 102a via monitoring. A monitoring operation may be referred to as shadowing, listening, or snooping. The secondary device 102b may receive the information about the first communication scheme via various schemes other than a scheme of receiving the information about the first communication scheme from the primary device 102a. For example, the secondary device 102b may receive, from an external server (not shown), the information about the first communication scheme stored in the external server (not shown). For another example, the secondary device 102b may receive, via the external server, the information about the first communication scheme transferred (or shared) from the primary device 102a.

The memories 201a and 201b of the external electronic device 102 may store at least one of audio contents which are stored by a user and a user profile, device information, device information of the external electronic device, and counterpart earphone information. The memories 201a and 201b may be configured to include a buffer (not shown) which temporarily stores audio data received from the electronic device 101.

In certain embodiments, the electronic device 101 can receive audio data. The audio data can include a transport stream in accordance with the Motion Picture Experts Group (MPEG) standard. The transport stream can include fixed packets of packetized elementary stream. The packetized elementary stream can include audio data compressed using Inverse Modification Discreet Cosine Transformation (IMDCT). The primary 102a and secondary devices 102b can decode the audio data resulting in a time based analog signal. The analog signal can be digitized using Pulse Code Modulation samples at different numbers of samples per second. That is, one second of the analog signal can be represented by different numbers of a PCM samples, based on the digitization rate.

The communication circuits 203a and 203b of the external electronic device 102 may communicate with an external electronic device (e.g., the electronic device 101) via a short-range wireless communication (e.g., Bluetooth (BT) or Wi-Fi), and may be configured to include an antenna for the short-range wireless communication.

The processors 205a and 205b of the external electronic device 102 may control the communication circuits 203a and 203b to connect to the electronic device 101 with the first communication scheme (e.g., Bluetooth (BT)), The processors 205a and 205b can decode audio data received via buffers of the memories 201a and 201b, thereby resulting in PCM samples. The PCM modulation samples can digitize the audio content using a particular rate having a particular number of samples per second. The processors 205a, 205b can cause audio output circuits 209a and 209b to output sound from the processed PCM samples.

The processors 205a and 205b may change a processing number of PCM samples from the first number of PCM samples to a second number of PCM samples in response to receiving a request for adjusting a size of the buffer from the electronic device 101. The processors 205a and 205b can process the PCM samples which are obtained by decoding the audio data received via the buffer with the second number of PCM samples while the size of the buffer is adjusted, and control the audio output circuits 209a and 209b to output PCM samples that digitize the sound signals at the second number of PCM samples.

When the size of the buffer being adjusted reaches a designated buffer size, the processors 205a and 205b may process PCM samples which are obtained by decoding audio data received via the buffer of the designated buffer size with the first number of PCM samples, and control the audio output circuits 209a and 209b to output PCM samples which are processed with the first number of PCM samples.

The sensor modules 207a and 207b of the external electronic device 102 may be configured to include at least one of a motion sensor (e.g., an acceleration sensor, and a gyro sensor), a proximity sensor, or a biometric sensor (e.g., including an optical sensor and an electrode). The sensor modules 207a and 207b may include various other sensors as well.

The audio output circuits 209a and 209b of the external electronic device 102 may be configured to output PCM samples of audio data processed by the processors 205a and 205b via a speaker so that the user may hear the audio data received from the external electronic device 101.

The batteries 211a and 211b of the external electronic device 102 may supply power to at least one component of the external electronic device 102. According to an embodiment, the batteries 211a and 211b may include, for example, a non-rechargeable primary battery, a rechargeable secondary battery, or a fuel battery.

Figure 3:
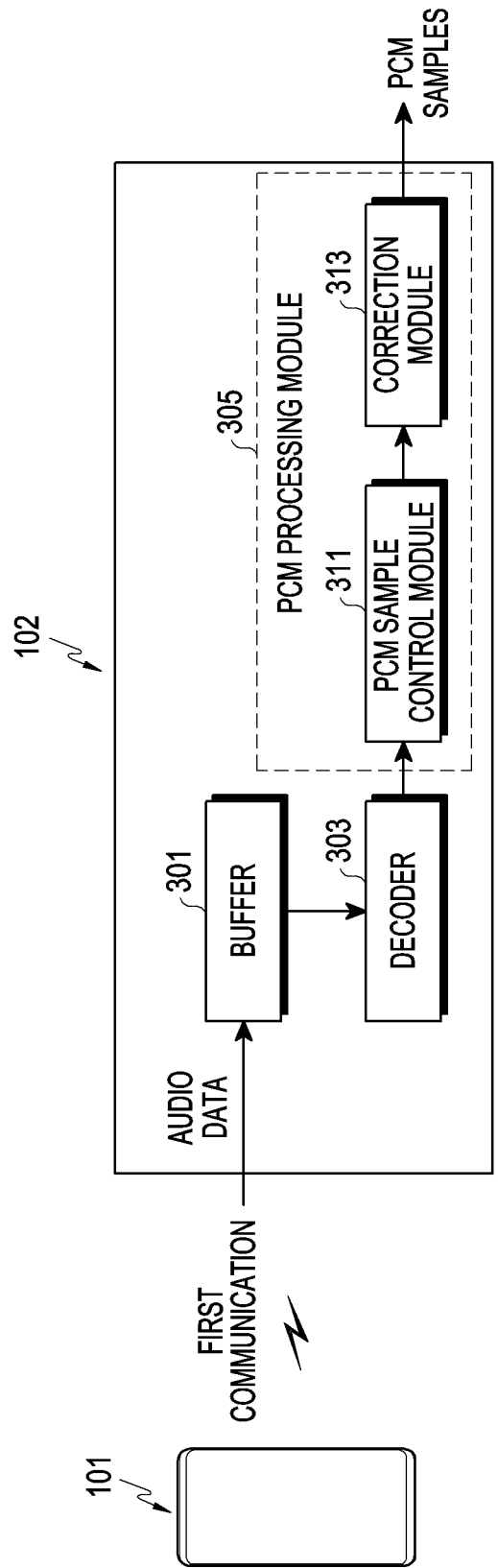
FIG. 3 is a diagram illustrating an example of a structure of an electronic device and an external electronic device according to an embodiment.

FIG. 3 is a diagram illustrating an example of a structure of an electronic device and an external electronic device according to an embodiment.

The external electronic device 102 receives audio data from the electronic device 101. The audio data can include audio data compressed in accordance with the MPEG standard. The audio data is received in a buffer 301. The decoder decodes the audio data and provides the decoded audio data to a PCM sample module 311. The PCM sampling module 311 digitizes the decoded audio signal at a particular sampling rate. The correction module 313 corrects PCM samples so that the pitch is maintained.

A structure of an external electronic device 102 to be described with reference to FIG. 3 will be described based on a primary device (e.g., a primary device 102a in FIG. 2), and a secondary device of the external electronic device 102 (e.g., a secondary device 102b in FIG. 2) may be configured to include the same components as the primary device, and may perform the same operations as the primary device. For another example, even if the external electronic device 102 is configured as a single device without being divided into the primary device and the secondary device, the external electronic device 102 may be configured to include the same components as the primary device and may perform the same operations as the primary device.

Referring to FIG. 3, the external electronic device 102 (e.g., the primary device 102a or the secondary device 102b in FIG. 2) according to an embodiment may be configured to include a buffer 301, a decoder 303, and a pulse code modulation (PCM) processing module 305. The PCM processing module 305 may be configured to include a PCM sample control module 311 and a correction module 313. The PCM processing module 305 may be configured as a separate component which is included in a processor 205*a* in FIG. 2 or controlled by the processor 205*a*.

According to an embodiment, the external electronic device 102 may control to temporarily store audio data which is received from the electronic device 101 via a communication circuit (e.g., a communication circuit 203*a* in FIG. 2) in a buffer 301 of a memory (e.g., a memory 201*a* in FIG. 2). The external electronic device 102 may decode the audio data stored in the buffer 301 by using the decoder 303, and process PCM samples of decoded audio data outputted from the decoder 303 via the PCM processing module 305. Upon receiving audio data while a buffer size of the buffer 301 is set to a first buffer size, the external electronic device 102 may process PCM samples of audio data which is received from the buffer 301 of the first buffer size and then decoded with a first number of PCM samples via the PCM processing module 305, and control an audio output circuit (e.g., an audio output circuit 209*a* in FIG. 2) to output PCM samples which are processed with the first number of PCM samples.

According to an embodiment, when receiving a request for adjusting the size of the buffer 301 from the electronic device 101, the external electronic device 102 may perform operations for adjusting the size of the buffer 301 based on information related to a buffer size received from the electronic device 101. For example, the external electronic device 102 may receive the information related to the buffer size from the electronic device 101 and identify a designated buffer size based on the received information related to the buffer size. The information related to the buffer size may include at least one of information about the designated buffer size, information about a type of an application run on the external electronic device 102, or information about communication quality. For example, the external electronic device 102 may directly detect communication quality of a communication between the electronic device 101 and the external electronic device 102, and may identify the designated buffer size based on information related to the directly detected communication quality.

According to an embodiment, the external electronic device 102 may change a processing number of PCM samples from a first number of PCM samples to a second number of PCM samples in response to the request for adjusting the size of the buffer 301 from the electronic device 101. The second number of PCM samples may be a number which is increased than the first number of PCM samples so as to increase the size of the buffer 301, or a number which is decreased than the first number of PCM samples so as to decrease the size of the buffer 301. In an embodiment, when the primary device 102*a* of the external electronic device 102 receives the request for adjusting the size of the buffer 301 from the electronic device 101, the primary device 102*a* of the external electronic device 102 may transmit, to the secondary device 102*b*, the information about the designated buffer size and information about the second number of PCM samples which is changed for the primary device 102*a* to be synchronized with a buffer of the secondary device 102*b* of the external electronic device 102 and adjust the size of the buffer 301, and the information about the designated buffer size to the secondary device 102*b*. In response to the change in the processing number of PCM samples to the second number of PCM samples, the external electronic device 102 may change a processing number of PCM samples for processing PCM samples which are obtained by decoding audio data received from the buffer 301 while the size of the buffer is adjusted to the second number of PCM samples, process the obtained PCM samples with the changed second number of PCM samples via the PCM processing module 305, and control the audio output circuit (e.g., the audio output circuit 209*a* in FIG. 2) to output processed PCM samples.

According to an embodiment, when the size of the buffer 301 being adjusted reaches the designated buffer size, the external electronic device 102 may change the processing number of PCM samples from the second number of PCM samples back to the first number of PCM samples, process PCM samples which are obtained by decoding audio data received via the buffer 301 with the first number of PCM samples, and control the audio output circuit (e.g., the audio output circuit 209*a* in FIG. 2) to output PCM samples which are processed with the first number of PCM samples. The size of the buffer 301 may be gradually or stepwise adjusted (e.g., increased or decreased) from a previous buffer size (e.g., a first buffer size) until the size of the buffer 301 reaches the designated buffer size (e.g., a second buffer size) corresponding to a fact that the PCM samples are processed with the second number of PCM samples). For example, the request for adjusting the size of the buffer 301 may be received via a request message of a message format message (or a packet) according to the first communication scheme. The request message may include, for example, control information indicating a decrease or increase to a buffer size which is designated according to contents (or an application) executed in the electronic device 101. The request message may include, for example, information (e.g., a type of the contents (or the application)) related to the contents (or the application) executed in the electronic device 101. The request message may include, for example, information about a buffer size which is directly designated by the user via a menu displayed on a display of the electronic device 101.

According to an embodiment, the external electronic device 102 may correct the PCM samples which are processed with the second number of PCM samples so that a pitch is maintained.

According to an embodiment, the primary device (PE) (e.g., the primary device 102*a* in FIG. 2) of the external electronic device 102 may synchronize a buffer of the primary device with a buffer of the secondary device (SE) (e.g., the secondary device 102*b* in FIG. 2) while the size of the buffer 301 is adjusted. For example, upon receiving a buffer size adjustment request from the electronic device 101, the primary device may transmit information related to buffer size adjustment to the secondary device. As the secondary device transmits a response to the request to the primary device, the primary device and the secondary device may adjust the size of the buffer 301 so that the size of the buffer 301 is changed to a designated buffer size while processing PCM samples with the changed processing number of PCM samples (e.g., the second number of PCM samples). When the size of the buffer 301 being adjusted reaches the designated buffer size and the change is completed, the primary device and the secondary device may exchange state information with each other and process PCM samples with the first number of PCM samples at the same time. For example, when the buffer size change is completed, the primary device and the secondary device may identify that the change in the buffer size is completed without exchanging buffer size change completion information and process PCM samples with the first number of PCM samples.

According to an embodiment, the external electronic device 102 may process, differently for each of types of applications, operations for adjusting a processing number of PCM samples which are processed via the PCM sample processing module 305 and adjusting the buffer size. For example, a change in the buffer size in a case of playing a game may be performed faster than a change in the buffer size in a case of playing music. Accordingly, for the game, the external electronic device 102 may adjust a number of PCM samples from the first number of PCM samples to the second number of PCM samples (a number which is decreased from the first number of PCM samples), and adjust the buffer size to a second buffer size (e.g., 100 ms). As described above, in an embodiment, major components of the external electronic device 102 have been described with reference to the external electronic device 102 in FIGS. 2 and 3. However, in certain embodiments, not all of the components shown in FIGS. 2 and 3 are essential components, and the external electronic device 102 (e.g., the primary device 102a or the secondary device 102b) may be implemented by more components or fewer components than the components shown in FIGS. 2 and 3. In addition, a location of each of the major components of the external electronic device 102 described above with reference to FIGS. 2 and 3 may be changed according to certain embodiments.

Figure 4:
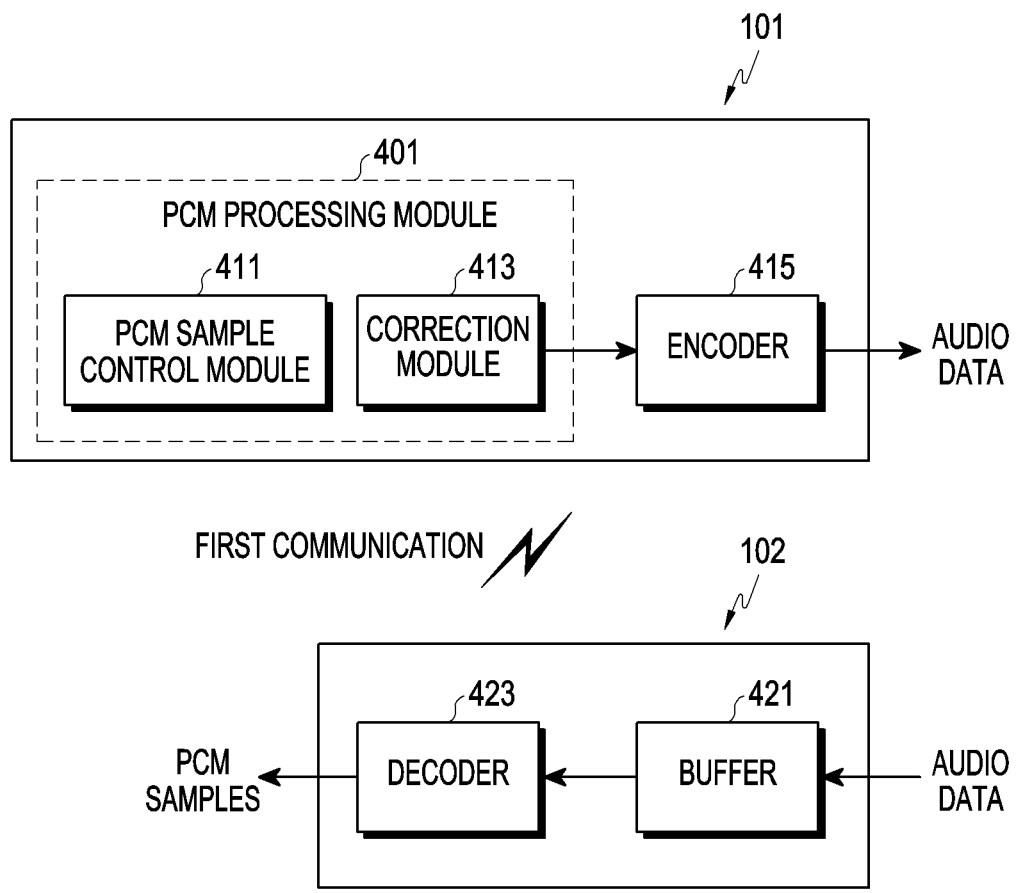
FIG. 4 is a diagram illustrating an example of a structure of an electronic device and an external electronic device according to another embodiment.

FIG. 4 is a diagram illustrating an example of a structure of an electronic device and an external electronic device according to another embodiment.

Referring to FIGS. 1 and 4, an electronic device 101 according to another embodiment may be configured to include a PCM processing module 401 which processes PCM samples of an audio signal (an audio source) and an encoder 403 which encodes processed PCM samples as components for controlling a buffer 421 (e.g., a buffer 301 in FIG. 3) of an external electronic device 102. The PCM processing module 401 and the encoder 403 may be configured as a separate component which is included in a processor (e.g., a processor 120 in FIG. 1) of the electronic device 101 or which is controlled by the processor. In certain embodiments, the encoder can comprises a hardware accelerator or a Application Specific Integrated Circuit (ASIC). The PCM processing module 401 may be configured to include a PCM sample control module 411 for changing a processing number of PCM samples for an audio signal (an audio source) based on information related to a size of a buffer 421 (e.g., a buffer 301 in FIG. 3) of the external electronic device 102, and a correction module 413 for correcting processed PCM samples so that a pitch value of the PCM samples which are processed by the PCM sample control module 411 is maintained.

The processor of the electronic device 101 may pre-designate and store the information about the size of the buffer 421 of the external electronic device 102, or receive the information about the size of the buffer 421 of the external electronic device 102 from the external electronic device 102. Generally speaking, a buffer with less memory can hold audio data representing less time, or can hold audio data where the PCM samples are sampled at a lower sampling rate. In certain embodiments, to avoid buffer overflow, the sampling rate is reduced when the buffer size is reduced. Accordingly, the processor of the electronic device 101 may identify whether the size of the buffer 421 is changed based on the information related to the size of the buffer 421 of the external electronic device 102.

According to another embodiment, the processor of the electronic device 101 may process the PCM samples of the audio signal with a first number of PCM samples via the PCM processing module 401, encode the PCM samples of the audio signal via the encoder 403, and transmit, to the external electronic device 102, audio data for encoded PCM samples to control the external electronic device 102 to output the audio data. Here, the first number of PCM samples may be a number which is initially set or identified corresponding to buffer size information set in contents (or an application) including the audio signal.

According to another embodiment, the processor of the electronic device 101 may identify whether the size of the buffer 421 of the external electronic device 102 is changed and a changed size of the buffer 421 based on the information related to the size of the buffer 421 of the external electronic device 102. The processor of the electronic device 101 may control to change the processing number of PCM samples for the audio signal via the PCM processing module 401 based on the changed size of the buffer 421 which is identified based on the information related to the size of the buffer 421, and to process PCM samples which are processed with the changed processing number of PCM samples (e.g., a second number of PCM samples). The processor of the electronic device 101 may control to encode the PCM samples which are processed with the changed processing number of PCM samples (e.g., the second number of PCM samples) via the encoder 403, and transmit audio data for the encoded PCM samples to the external electronic device 102 via a communication circuit (e.g., a communication module 190 in FIG. 1).

According to another embodiment, the processor of the electronic device 101 may control to correct the processed PCM samples which are processed with the changed processing number of PCM samples (e.g., a second number of PCM samples) via the correction module 413 so that a pitch value is maintained.

According to another embodiment, the external electronic device 102 may temporarily store audio data received from the electronic device 101 in the buffer 421 (e.g., the buffer 301 in FIG. 3), decode the audio data outputted from the buffer 421 according to the size of the buffer 421 via a decoder 423 (e.g., a decoder 303 in FIG. 3), and output PCM samples of decoded audio data via an audio output circuit (e.g., audio output circuits 209a and 209b in FIG. 2).

The electronic device 101 according to an embodiment and another embodiment may obtain information related to signal strength or communication quality of a communication between the electronic device 101 and the external electronic devices 102 when the external electronic device 102 is connected to the electronic device 101. The electronic device 101 may transmit, to the external electronic device 102, information related to the signal strength or the communication quality as information related to a buffer size, and the external electronic device 102 may identify a designated buffer size which corresponds to the signal strength or the communication quality based on the received information related to the buffer size.

According to an embodiment, the electronic device 101 may identify the communication quality based on a retransmission rate for a packet transmitted to the external electronic device 102, effective channel map information, or RSSI information. For example, if the communication quality is poor, the external electronic device 102 may not normally receive a packet transmitted by the electronic device 101, and thus the external electronic device 102 may transmit a NACK or may not transmit a response packet. The electronic device 101 may retransmit the same packet until the external electronic device 102 normally receives the packet (e.g., until the external electronic device 102 transmits an ACK). For another example, if a distance between the electronic device 101 and the external electronic device 102 increases, received RSSI may be low. The electronic device 101 may identify that the communication quality is poor if the received RSSI is less than or equal to a designated threshold value. According to an embodiment, if the communication quality is poor, the electronic device 101 may request to increase the buffer size of the external electronic device 102, thereby decreasing occurrence of sound interruption or noise. According to an embodiment, if the communication quality is good, the electronic device 102 may request to decrease the buffer size of the external electronic device 102, thereby outputting audio without latency in a state in which sound quality is not degraded.

The external electronic device 102 according to one embodiment and another embodiment may directly identify the signal strength or the communication quality of the communication between the electronic device 101 and the external electronic device 102. In this case, the external electronic device 102 may adjust the size of the buffer to increase or decrease the size of the buffer to the designated buffer size based on information related to a buffer size according to the signal strength or communication quality which is directly identified by the external electronic device 102 without receiving the information related to the buffer size from the electronic device 101.

An electronic device (e.g., an external electronic device 102 in FIGS. 1 to 3) according to an embodiment may include a communication circuit (e.g., a communication circuit 203a or 203b in FIG. 2), a memory (e.g., a memory 201a or 201b in FIG. 2) including a buffer (e.g., a buffer 301 in FIG. 3) configured to store audio data received from an external electronic device via the communication circuit, an audio output circuit (e.g., an audio output circuit 209a or 209b in FIG. 2), and a processor (e.g., a processor 205a or 205b in FIG. 2) electrically connected to the communication circuit, the memory, and the audio output circuit, and the processor may be configured to: control the communication circuit to connect to the external electronic device with a first communication scheme, process pulse code modulation (PCM) samples which are obtained by decoding audio data outputted from the buffer with a first number of PCM samples, and control the audio output circuit to output the PCM samples which are processed with the first number of PCM samples, in response to receiving a request for adjusting a size of the buffer from the external electronic device, change a processing number of the PCM samples from the first number of PCM samples to a second number of PCM samples, in response to the change in the processing number of the PCM samples to the second number of PCM samples, process PCM samples which are obtained by decoding audio data outputted from the buffer with the second number of PCM samples while the size of the buffer is adjusted, and control the audio output circuit to output the PCM samples which are processed with the second number of PCM samples, and when the size of the buffer being adjusted reaches a designated buffer size, process PCM samples which are obtained by decoding audio data outputted from the buffer with the first number of PCM samples, and control the audio output circuit to output the PCM samples which are processed with the first number of PCM samples.

According to an embodiment, the processor (e.g., the processor 205a or 205b in FIG. 2) may be further configured to correct the PCM samples which are processed with the second number of PCM samples so that a pitch is maintained.

According to an embodiment, the processor (e.g., the processor 205a or 205b in FIG. 2) may be configured to control the communication circuit to transmit information related to a state of the buffer to the external electronic device. The information related to the size of the buffer may include at least one of information about the designated buffer size, information about a type of an application run on the external electronic device, or information about communication quality.

According to an embodiment, the processor (e.g., the processor 205a or 205b in FIG. 2) may be configured to control the communication circuit to transmit information related to a state of the buffer to the external electronic device.

According to an embodiment, the first communication scheme may be a Bluetooth communication.

According to an embodiment, the processor (e.g., the processor 205a or 205b in FIG. 2) may be further configured to connect to a secondary device via the first communication scheme when the electronic device performs a role of a primary device, transmit the audio data which is received from the external electronic device to the secondary device, and in response to receiving the request for adjusting the size of the buffer, control the communication circuit to transmit information about the changed second number of PCM samples and information about the designated buffer size to the secondary device, and the buffer may be synchronized with a buffer of the secondary device.

An electronic device (e.g., a first electronic device 101 in FIGS. 1 and 2) according to another embodiment may include a communication circuit (e.g., a communication module 190 in FIG. 1), a memory (e.g., a memory 130 in FIG. 1), an audio processing circuit (a sound output device 155 in FIG. 1), and a processor (e.g., a processor 120 in FIG. 1) electrically connected to the communication circuit, the memory, and the audio processing circuit, and the processor may be configured to: control the communication circuit to connect to an external electronic device with a first communication scheme, control the audio processing circuit to process pulse code modulation (PCM) samples for an audio source with a first number of PCM samples, control the communication circuit to transmit, to the external electronic device, audio data which is generated by encoding PCM samples which are processed with the first number of PCM samples, in response to identifying occurrence of an event for controlling a buffer of the external electronic device, control the audio processing circuit to process the PCM samples for the audio signal with a second number of PCM samples, control the communication circuit to transmit, to the external electronic device, audio data which is generated by encoding PCM samples which are processed with the second number of PCM samples, and when identifying that a size of the buffer of the external electronic device being adjusted reaches a designated buffer size, control the communication circuit to transmit, to the external electronic device, audio data which is generated by encoding PCM samples which are processed with the first number of PCM samples.

According to another embodiment, the processor (e.g., the processor 120 in FIG. 1) may be further configured to correct the PCM samples which are processed with the second number of PCM samples so that a pitch is maintained.

According to another embodiment, the processor (e.g., the processor 120 in FIG. 1) may be further configured to obtain information related to the size of the buffer, and identify the designated buffer size based on the information related to the size of the buffer.

According to another embodiment, the processor (e.g., the processor 120 in FIG. 1) may be configured to identify that the event occurs when contents which generate the audio source are changed.

According to another embodiment, the processor (e.g., the processor 120 in FIG. 1) may be configured to identify that the event occurs when communication quality of the first communication scheme changes.

According to another embodiment, the electronic device may further comprise a display (e.g., a display 160 in FIG. 1), and the processor (e.g., the processor 120 in FIG. 1) may be configured to identify that the event occurs when information related to at least one buffer size which is displayed on the display is selected by a user.

According to another embodiment, the first communication scheme may be a Bluetooth communication.

The operation procedure in the electronic device (e.g., the external electronic device 102 in FIGS. 1 to 3) as described above will be described in detail with reference to the accompanying drawings.

Figure 5:
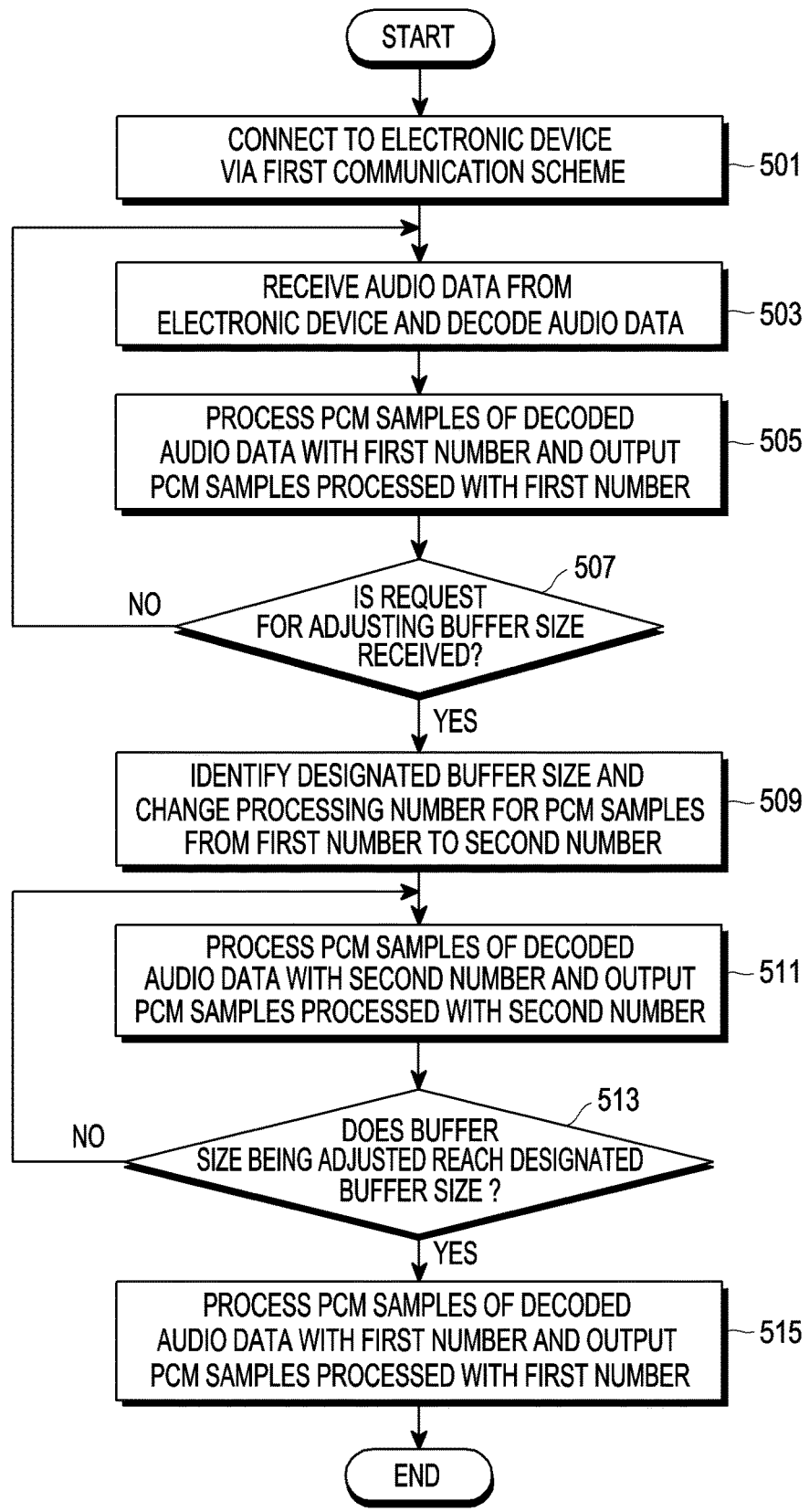
FIG. 5 is a diagram illustrating an example of an operation procedure for controlling a buffer in an external electronic device according to an embodiment.

FIG. 5 is a diagram illustrating an example of an operation procedure for controlling a buffer in an external electronic device according to an embodiment.

Referring to FIG. 5, in operation 501, an external electronic device (e.g., an external electronic device 102 in FIGS. 1 to 3) according to an embodiment may be connected to an electronic device (e.g., an electronic device 101 in FIGS. 1 and 2) via a first communication scheme (e.g., a Bluetooth communication).

In operation 503, the external electronic device may store, in a buffer (e.g., a buffer 301 in FIG. 3), audio data which is received from the electronic device (e.g., the electronic device 101 in FIGS. 1 and 2) via a communication circuit (e.g., a communication circuit 203*a* or 203*b* in FIG. 2), and decode the audio data outputted from the buffer. The external electronic device may receive audio data for contents (or an application) executed in the electronic device, and temporarily store the received audio data in the buffer. When the audio data temporarily stored in the buffer whose buffer size is set to a first buffer size (e.g., 100 ms) is outputted from the buffer, the external electronic device may decode the audio data by using a decoder (a decoder 303 in FIG. 3).

In operation 505, the external electronic device may process PCM samples of decoded audio data with a set first number of PCM samples by using a PCM processing module (e.g., a PCM processing module 305 in FIG. 3). The external electronic device may output PCM samples (e.g., first PCM samples) which are processed with the first number of PCM samples via an audio output circuit (e.g., audio output circuits 209*a* and 209*b* in FIG. 2).

In operation 507, the external electronic device may identify whether a request (e.g., a request message) for adjusting a buffer size from a first electronic device is received while outputting the PCM samples (e.g., the first PCM samples) which are processed with the first number of PCM samples. If the request (e.g., the request message) for adjusting the buffer size is received, the external electronic device may perform operation 509. If the request (e.g., the request message) for adjusting the buffer size is not received, the external electronic device may decode audio data which is continuously outputted from the buffer whose buffer size is set to the first buffer size (e.g., 100 ms) and process PCM samples of decoded audio data with the first number of PCM samples by performing operation 503 again.

In operation 509, in response to receiving the request (e.g., the request message) for adjusting the buffer size from the first electronic device, the external electronic device may identify a designated buffer size based on information related to a buffer size included in the request message, and change the processing number of PCM samples from the first number of PCM samples to a second number of PCM samples. For example, the external electronic device may identify a second buffer size (e.g., 300 ms) which is the designated buffer size, and change the processing number of PCM samples to the second number of PCM samples based on the identified second buffer size.

In operation 511, while the buffer size is adjusted by the second buffer size (e.g., 300 ms), the external electronic device may process PCM samples (e.g., second PCM samples) which are obtained by decoding audio data received via the buffer with the second number of PCM samples, and output PCM samples (e.g., second PCM samples) which are processed with the second number of PCM samples via an audio output circuit (e.g., audio output circuits 209*a* and 209*b* in FIG. 2).

In operation 513, the external electronic device may identify whether the buffer size being adjusted reaches the second buffer size (e.g., 300 ms) which is the designated buffer size. If the buffer size being adjusted reaches the second buffer size (e.g., 300 ms), the external electronic device may perform operation 515. If the buffer size being adjusted does not reach the second buffer size (e.g., 300 ms), the external electronic device may continuously process the PCM samples of the decoded audio data with the second number of PCM samples by performing operations 511 to 513.

In operation 515, the external electronic device may process PCM samples which are obtained by decoding audio data outputted from the buffer whose buffer size is changed to the second buffer size (e.g., 300 ms) with the first number of PCM samples, and output PCM samples (e.g., first PCM samples) which are processed with the first number of PCM samples via the audio output circuit (e.g., the audio output circuits 209*a* and 209*b* in FIG. 2).

According to another embodiment, when receiving the buffer size adjustment request as in operation 507, the external electronic device may perform an operation of gradually or stepwise adjusting the size of the buffer (e.g., the buffer 301 in FIG. 3) until the size of the buffer (e.g., the buffer 301 in FIG. 3) reaches a designated buffer size without performing operations 509 and 513, and process, as in operation 515, the PCM samples of the decoded audio data with the first number of PCM samples to output PCM samples which are processed with the first number of PCM samples.

According to still another embodiment, when receiving the buffer size adjustment request as in operation 507, the external electronic device may perform an operation of gradually or stepwise adjusting the size of the buffer (e.g., the buffer 301 in FIG. 3) until the size of the buffer (e.g., the buffer 301 in FIG. 3) reaches the designated buffer size without performing operations 509 and 513, and process, as in operation 515, the PCM samples of the decoded audio data with a first speed which is a play speed for the decoded audio data to output PCM samples which are processed with the first speed.

Figure 6A:
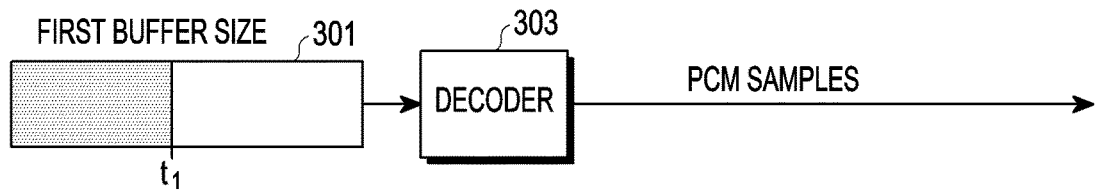
FIG. 6A-6C are diagrams illustrating an example of an operation procedure for controlling a buffer in an external electronic device according to an embodiment.
Figure 6B:
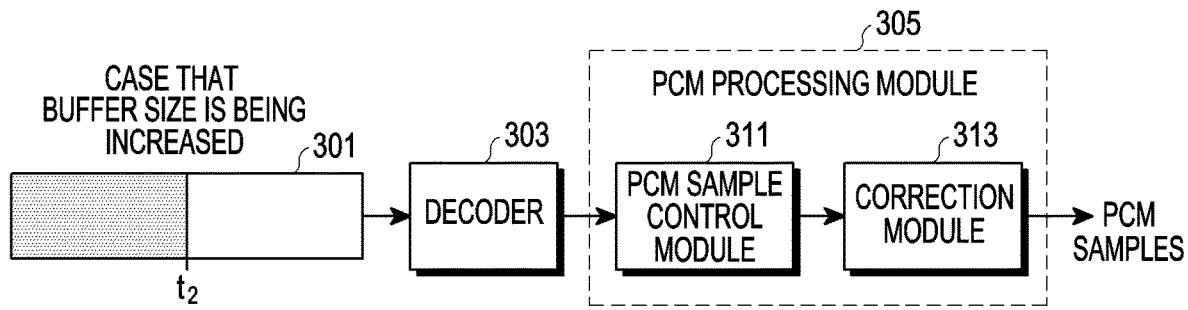
Figure 6C:
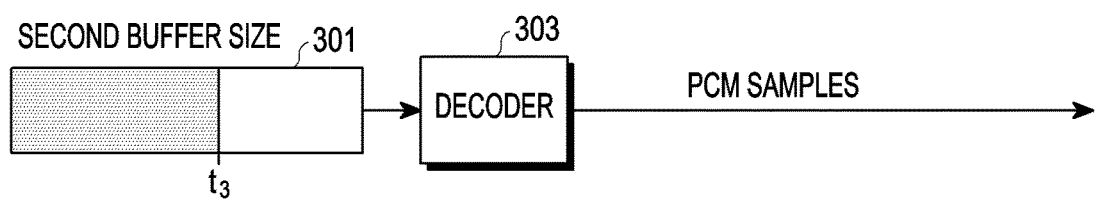

FIG. 6A-6C are diagrams illustrating an example of an operation procedure for controlling a buffer in an external electronic device according to an embodiment.

According to an embodiment, as shown in FIG. 6A, when receiving audio data from an electronic device (e.g., an electronic device 101 in FIGS. 1 and 2), an external electronic device (e.g., an external electronic device 102 in FIGS. 1 to 3) may temporarily store the received audio data in a buffer 301 (e.g., a buffer 301 in FIG. 3) whose buffer size is set to a first buffer size (t1 size (e.g., 100 ms)). The external electronic device may decode the audio data outputted from the buffer 301 via a decoder 303 (e.g., a decoder 303 in FIG. 3), and process PCM samples (e.g., first PCM samples) of decoded audio data with a first number of PCM samples to output PCM samples which are processed with the first number of PCM samples.

According to an embodiment, as shown in FIG. 6B, in response to receiving a request for increasing the size of the buffer 301 from the electronic device (the electronic device 101 in FIG. 1), the external electronic device may adjust the size of the buffer 301 by increasing the size of the buffer 301 so that the size of the buffer 301 is a designated buffer size (t3 size (e.g., 300 ms)). While the size of the buffer 301 is increased by the designated buffer size (e.g., t3 size), the external electronic device may decode the audio data outputted from the buffer 301 via the decoder 303, and process PCM samples (e.g., second PCM samples) of decoded audio data with a changed second number of PCM samples (e.g., a number increased from the first number of PCM samples) to output PCM samples which are processed with the second number of PCM samples via a PCM processing module 305 (e.g., a PCM processing module 305 in FIG. 3). The PCM processing module 305 may be configured to include a PCM sample control module 311 (e.g., a PCM sample control module 311 in FIG. 3) and a correction module 313 (e.g., a correction module 313 in FIG. 3). The PCM sample control module 311 may change a processing number for processing PCM samples of audio data which is decoded in the decoder 303 from the first number of PCM samples to the second number of PCM samples based on the designated buffer size, and process PCM samples (e.g., second PCM samples) with the changed second number of PCM samples. The correction module 313 may correct PCM samples which are processed with the second number of PCM samples so that a pitch is maintained, and output corrected PCM samples (e.g., second PCM samples) to an audio output circuit (e.g., an audio output circuit 209a or 209b in FIG. 2).

According to an embodiment, as shown in FIG. 6C, when the size of the buffer 301 is increased and reaches a second buffer size (e.g., t3 size) which is the designated buffer size, the external electronic device may decode the audio data outputted from the buffer 301 via the decoder 303, and process PCM samples (e.g., first PCM samples) of the decoded audio data with the first number of PCM samples to output processed PCM samples which are processed with the first number of PCM samples. As the PCM samples (e.g., the second PCM samples) are processed with the second number of PCM samples, the buffer size may be increased gradually or stepwise until the buffer size reaches the second buffer size.

Figure 7A:
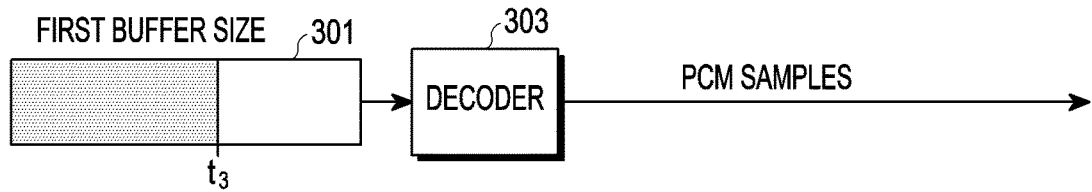
FIG. 7A-7C are diagrams illustrating an example of an operation procedure for controlling a buffer in an external electronic device according to an embodiment.
Figure 7B:
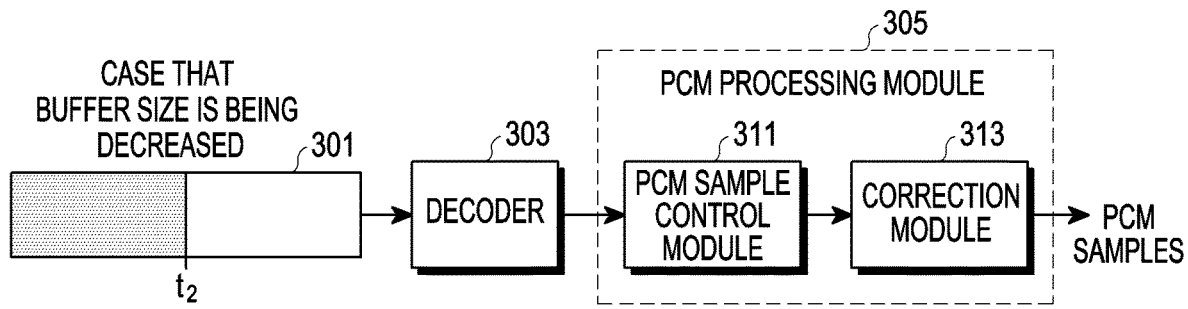
Figure 7C:
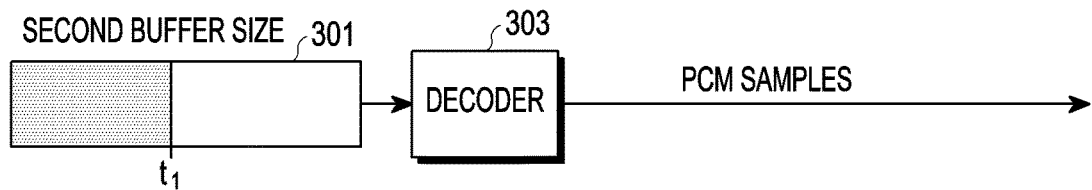

FIG. 7A-7C are diagrams illustrating an example of an operation procedure for controlling a buffer in an external electronic device according to an embodiment.

According to an embodiment, as shown in FIG. 7A, when receiving audio data from a first electronic device (e.g., a first electronic device 101 in FIGS. 1 and 2) which exists outside, an external electronic device (e.g., an external electronic device 102 in FIGS. 1 to 3) may temporarily store the received audio data in a buffer 301 (e.g., a buffer 301 in FIG. 3) whose buffer size is set to a first buffer size (t3 size (e.g., 300 ms)). The external electronic device may decode the audio data outputted from the buffer 301 via a decoder 303 (e.g., a decoder 303 in FIG. 3), and process PCM samples (e.g., first PCM samples) of decoded audio data with a first number of PCM samples to output PCM samples which are processed with the first number of PCM samples.

According to an embodiment, as shown in FIG. 7B, in response to receiving a request for decreasing the size of the buffer 301 to a designated buffer size (t1 size (e.g., 100 ms)) from the first electronic device, the external electronic device may adjust the size of the buffer 301 by decreasing the size of the buffer 301 so that the size of the buffer 301 is the designated buffer size (t1 size (e.g., 100 ms)). While the size of the buffer 301 is decreased to the designated buffer size (e.g., t1 size), the external electronic device may decode the audio data outputted from the buffer 301 via the decoder 303, and process PCM samples (e.g., second PCM samples) of decoded audio data with a changed second number of PCM samples (e.g., a number decreased from the first number of PCM samples) to output PCM samples which are processed with the second number of PCM samples via a PCM processing module 305 (e.g., a PCM processing module 305 in FIG. 3). The PCM processing module 305 may be configured to include a PCM sample control module 311 (e.g., a PCM sample control module 311 in FIG. 3) and a correction module 313 (e.g., a correction module 313 in FIG. 3). The PCM sample control module 311 may change a processing number of PCM samples of audio data which is decoded in the decoder 303 from the first number of PCM samples to the second number of PCM samples based on the designated buffer size, and process PCM samples (e.g., second PCM samples) with the changed second number of PCM samples. The correction module 313 may correct PCM samples which are processed with the second number of PCM samples so that a pitch is maintained, and output corrected PCM samples (e.g., second PCM samples) to an audio output circuit (e.g., an audio output circuit 209a or 209b in FIG. 2).

According to an embodiment, as shown in FIG. 7C, when the size of the buffer 301 is gradually decreased and reaches the designated buffer size (e.g., t1 size), the external electronic device may decode the audio data outputted from the buffer 301 via the decoder 303, and process PCM samples (e.g., first PCM samples) of the decoded audio data with the first number of PCM samples to output processed PCM samples which are processed with the first number of PCM samples. As the PCM samples (e.g., the second PCM samples) are processed with the second number of PCM samples, the buffer size may be decreased gradually or stepwise until the buffer size reaches the second buffer size.

Figure 8:
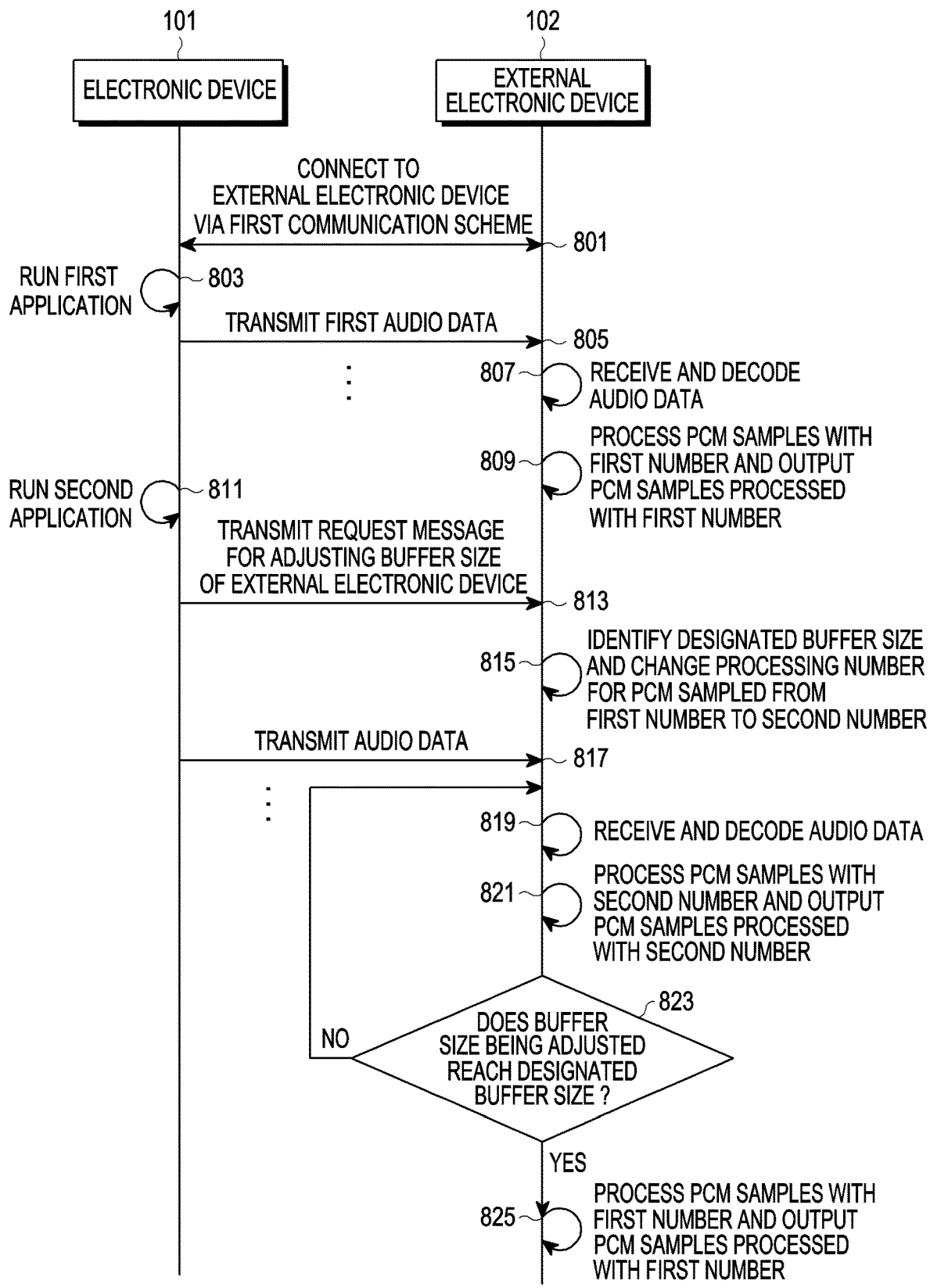
FIG. 8 is a diagram illustrating an example of an operation procedure for controlling a buffer in an electronic device and an external electronic device according to an embodiment.
Figure 9:
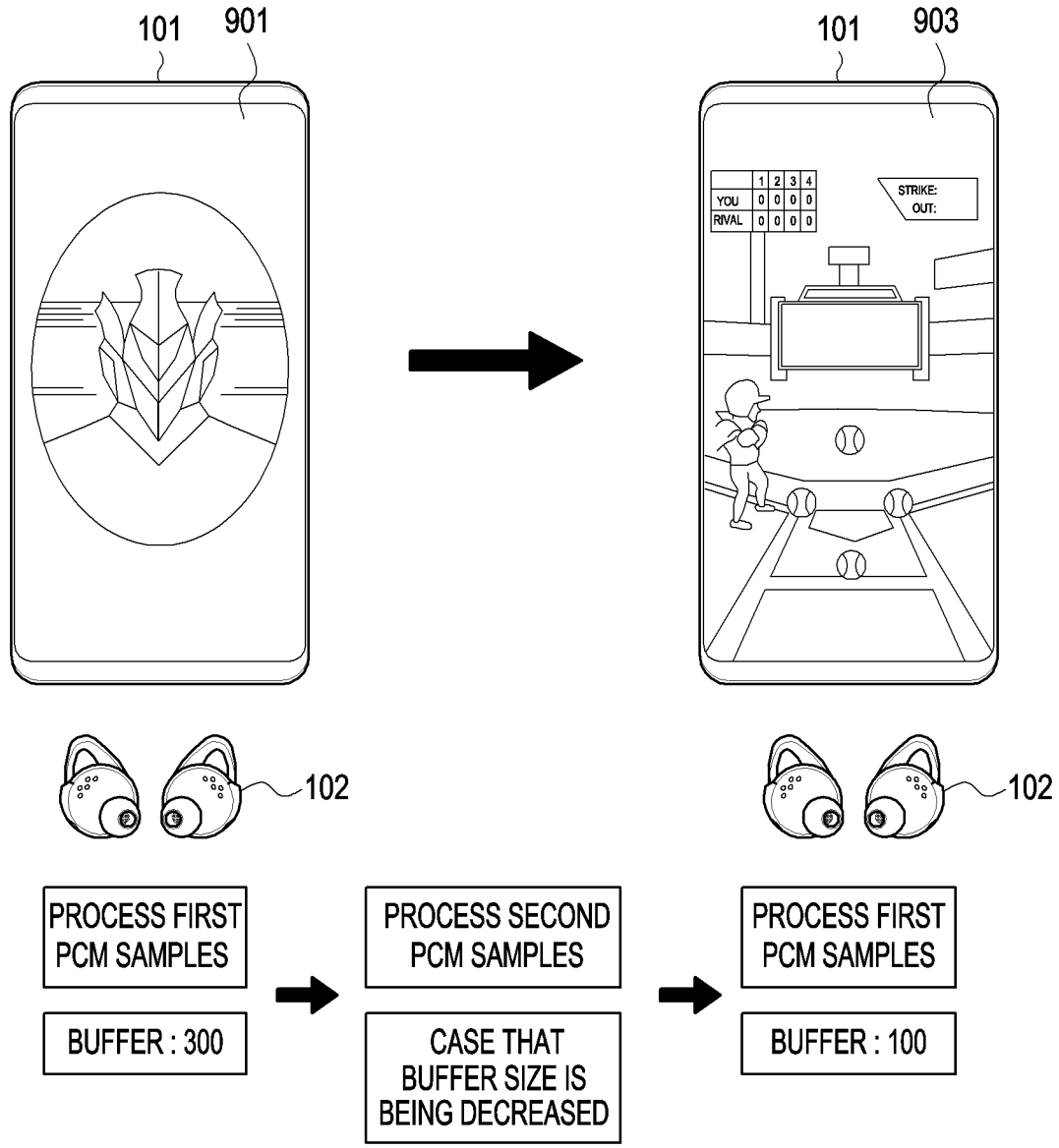
FIG. 9 is a diagram illustrating an example of an operation procedure for controlling a buffer in an electronic device and an external electronic device according to an embodiment.

FIG. 8 is a diagram illustrating an example of an operation procedure for controlling a buffer in an electronic device and an external electronic device according to an embodiment. FIG. 9 is a diagram illustrating an example of an operation procedure for controlling a buffer in an electronic device and an external electronic device according to an embodiment.

Referring to FIG. 8, in operation 801, according to an embodiment, an electronic device 101 (e.g., an electronic device 101 in FIGS. 1 and 2) may be connected to an external electronic device 102 (e.g., an external electronic device 102 in FIGS. 1 to 3) via a first communication scheme (e.g., a Bluetooth communication). For example, the electronic device 101 may be connected to a primary device (e.g., the secondary device 102a in FIG. 2) of the external electronic device 102 to perform a communication with the primary device of the external electronic device 102, and the primary device may perform a communication connection with a secondary device (e.g., the secondary device 102b in FIG. 2) of the external electronic device 102. The primary device may establish a communication link by transferring information for a communication connection (e.g., information related to a link) to the secondary device and receiving a response. For another example, the external electronic device 102 may be connected to the secondary device or to all of the primary device and the secondary device.

In operation 803, the electronic device 101 (e.g., the electronic device 101 in FIGS. 1 and 2) may run a first application (or first contents). For example, as shown in FIG. 9, the first application may be an application 901 which provides music.

In operation 805, the electronic device 101 may transmit audio data for the run first application to the external electronic device 102 via the first communication scheme (e.g., the Bluetooth communication). Buffer size information which is set in the external electronic device 102 corresponding to the first application may be a first buffer size (e.g., 300 ms). For example, the secondary device of the external electronic device 102 may receive audio data by monitoring a communication between the electronic device 101 and the primary device. For another example, the audio data may be transmitted to the primary device 102*a* of the external electronic device 102. The primary device 102*a* may transmit the received audio data to the secondary device 102*b* of the external electronic device 102 (e.g., the secondary device 102*b* in FIG. 2) via an established communication link. The primary device may transfer all audio data or some data (e.g., some data which is not transferred) to the secondary device. The primary device may transfer the received audio data according to a request of the secondary device, or may transfer the received audio data after inquiring whether the secondary device receives the received audio data. For another example, the electronic device 101 may transmit audio data to the secondary device or all of the primary device and the secondary device. In operation 807, the external electronic device 102 may receive audio data (e.g., first audio data) from the electronic device 101, temporarily stores the received audio data (e.g., the first audio data) in a buffer (e.g., in a buffer 301 in FIG. 3), and decode the first audio data outputted via the buffer. For example, a buffer size of the buffer may be set to a first buffer size (e.g., 300 ms) before receiving a buffer size adjustment request. For example, when the primary device receives audio data from the electronic device 101, the primary device may transfer the audio data to the secondary device. A buffer size of the primary device may be synchronized with a buffer size of the secondary device each other. When the buffer size is adjusted, in order to synchronize with the secondary device, the primary device may perform an operation of exchanging information for synchronization of a buffer size with the secondary device before a start of adjustment of the buffer size, setting a current buffer size to the same buffer size as the secondary device, and starting the adjustment of the buffer size simultaneously with the secondary device and terminating the adjustment of the buffer size simultaneously with the secondary device.

According to an embodiment, based on the audio data received from the electronic device 101 in operation 805, the external electronic device 102 may obtain at least one of information about a type of a first application run on the electronic device 101, information about a designated buffer size, or information related to communication quality as information related to a buffer size. The information related to the buffer size may be obtained periodically or when the audio data is received. For example, the external electronic device 102 may identify that a currently set buffer size (e.g., a first buffer size) does not need to be changed based on the obtained information related to the buffer size. In operation 809, the external electronic device 102 may process PCM samples of decoded audio data with a set first number of PCM samples. The external electronic device 102 may output PCM samples (e.g., first PCM samples) processed with the first number of PCM samples via an audio output circuit (e.g., audio output circuits 209*a* and 209*b* in FIG. 2). In an embodiment, as the primary device of the external electronics 102 transfers the received audio data (e.g., the first audio data) to the secondary device, the primary device and the secondary device may perform operation 809 in the same manner.

In operation 811, the electronic device 101 may run a second application while running the first application. For example, as shown in FIG. 9, the second application may be an application 903 which provides a game in which audio needs to be immediately outputted without latency. Buffer size information which is set corresponding to the second application may be a second buffer size (e.g., 100 ms). In operation 811, a case that the second application is run while the first application is run has been described as an example, but as another example, the electronic device 101 does not perform operation 811, and may set information related to adjustment of a buffer size based on immediacy if the immediacy is required while the electronic device 101 operates based on, for example, stability, while running the first application. For example, the electronic device 101 may display a setting screen which is displayed on a display (e.g., a display device 160 in FIG. 1) in order for a user to set information related to adjustment of a buffer size without running an additional application (e.g., the second application).

In operation 813, the electronic device 101 may transmit a request message for adjusting the buffer size of the external electronic device 102. For example, the electronic device 101 may transmit the request message according to running of the second application which is set to the second buffer size (e.g., 100 ms). For another example, if immediacy is required while the electronic device 101 operates based on, for example, stability, while running the first application, the electronic device 101 does not perform operation 811, and may transmit the request message including information related to adjustment of the buffer size which is set by the user in operation 813. The request message for adjusting the buffer size is configured in a designated packet format, and may include control information indicating buffer size adjustment and the information related to the buffer size. The information related to the buffer size may include at least one of information about a buffer size which is designated based on the second application, information about a type of the second application, and communication quality. For example, upon receiving the request message for adjusting the buffer size, the primary device of the external electronic device 102 may inform the secondary device of the request for adjusting the buffer size, and exchange information with the secondary device for synchronization of the buffer size.

In operation 815, as the external electronic device 102 receives the request message for adjusting the buffer size, the external electronic device 102 may identify the designated buffer size based on the information related to the buffer size included in the received request message. The external electronic device 102 may change a processing number of the PCM samples from the first number of PCM samples to the second number of PCM samples based on the designated buffer size. For example, the designated buffer size may be the second buffer size (e.g., 100 ms) which is set corresponding to the second application. The external electronic device 102 may transmit a packet including information related to a buffer state according to the change in the buffer size to the electronic device 101 at a time point at which the change in the buffer size starts as the request message is received. For example, when operation 815 is performed by the primary device of the external electronic device 102, the primary device may identify the designated buffer size for adjusting the buffer size based on the information related to the buffer size which is received according to the request for adjusting the buffer size, and change the processing number of the PCM samples from the first number of PCM samples to the second number of PCM samples. The primary device may change to the second number of PCM samples based on the designated buffer size. The primary device 102*a* may transmit, to the secondary device, information about the changed second number of PCM samples and information about the designated buffer size for requesting to adjust the buffer size. The secondary device may synchronize a buffer size of the secondary device with a buffer size of the primary device based on the information about the changed second number of PCM samples and the information about the designated buffer size, and decode audio data outputted from a buffer whose buffer size is adjusted and process decoded PCM samples in the same manner as the primary device.

In operation 817, the electronic device 101 may transmit audio data (e.g., second audio data) included in the second application to the external electronic device 102. For example, when the primary device of the external electronic device 102 receives the second audio data from the electronic device 101, the primary device may transfer the received second audio data to the secondary device.

In operation 819, the external electronic device 102 may receive the audio data, temporarily store the audio data in a buffer, and decode the audio data (e.g., the second audio data) outputted from the buffer so that a size of the buffer is changed to the second buffer size (e.g., 100 ms) which is the designated buffer size.

In operation 821, the external electronic device 102 may process PCM samples of the decoded audio data (e.g., the second audio data) with the changed second number of PCM samples and output PCM samples which are processed with the second number of PCM samples. For example, as the primary device of the external electronics 102 transfers the received audio data (e.g., the second audio data) to the secondary device, the primary device and the secondary device may perform operation 821 in the same manner. For example, as shown in FIG. 9, if a buffer size is decreased to the second buffer size (e.g., 100 ms) as the second application (e.g., game 903) is run while the first application (e.g., music 901) is being run in a first electronic device, the buffer size is decreased while the audio data remains in the buffer, and some audio data is lost, so a user may experience sound interruption. For preventing sound interruption or a change in a tone due to the decrease in the buffer size, the external electronic device 102 may process PCM samples of the audio data which is outputted from the buffer and decoded while the size of the buffer is decreased with the changed second number of PCM samples (a number decreased from the first number of PCM samples) and output PCM samples which are processed with the second number of PCM samples. The external electronic device 102 may correct the PCM samples which are processed with the second number of PCM samples so that a pitch is maintained.

In operation 823, the external electronic device 102 may identify whether the size of the buffer being adjusted reaches the second buffer size (e.g., 100 ms) which is the designated buffer size. If the size of the buffer reaches the second buffer size (e.g., 100 ms), operation 825 may be performed. If the size of the buffer does not reach the second buffer size (e.g., 100 ms), PCM samples of the decoded audio data may be processed with the second number of PCM samples while the size of the buffer is adjusted by performing operations 819 and 821. For example, all of the primary device and the secondary device may perform operation 823 in the same manner. For another example, when operation 823 is performed in the primary device of the external electronic device 102, the primary device may transmit, to the secondary device, control information according to a result of identifying whether the size of the buffer reaches the second buffer size (e.g., 100 ms).

In operation 825, as shown in FIG. 9, the external electronic device 102 may process PCM samples (e.g., first PCM samples) which are obtained by decoding audio data received via the buffer whose buffer size is changed to the second buffer size (e.g., 100 ms) with the first number of PCM samples, and output PCM samples (e.g., first PCM samples) which are processed with the first number of PCM samples via the audio output circuit (e.g., the audio output circuits 209*a* and 209*b* in FIG. 2). For example, the primary device and the secondary device may perform operation 825 in the same manner.

According to an embodiment, based on a fact that the second application is run, the electronic device 101 may transmit a signal indicating that the second application is run or information about the type of the second application to the external electronic device 102 in operation 813. The external electronic device 102 may adjust the size of the buffer to the designated buffer size based on information about the second application (e.g., the type of the second application).

In the operation procedure as shown in FIG. 8, operations of the primary device (e.g., the primary device 102*a* in FIG. 2) and the secondary device (e.g., the secondary device 102*b* in FIG. 2) of the external electronic device 102 have been described without being separated. However, for example, the operations of the external electronic device 102 may be performed in the primary device in the same manner, and the primary device may interwork with the secondary device. For example, the operations of the external electronic device 102 may be performed in the secondary device in the same manner, and the secondary device may interwork with the primary device. For example, if all of the primary device 102*a* and the secondary device receive audio data from the electronic device 101, the operations of the external electronic device 102 may be performed in all of the primary device 102*a* and the secondary device 102*b* in the same manner.

Figure 10:
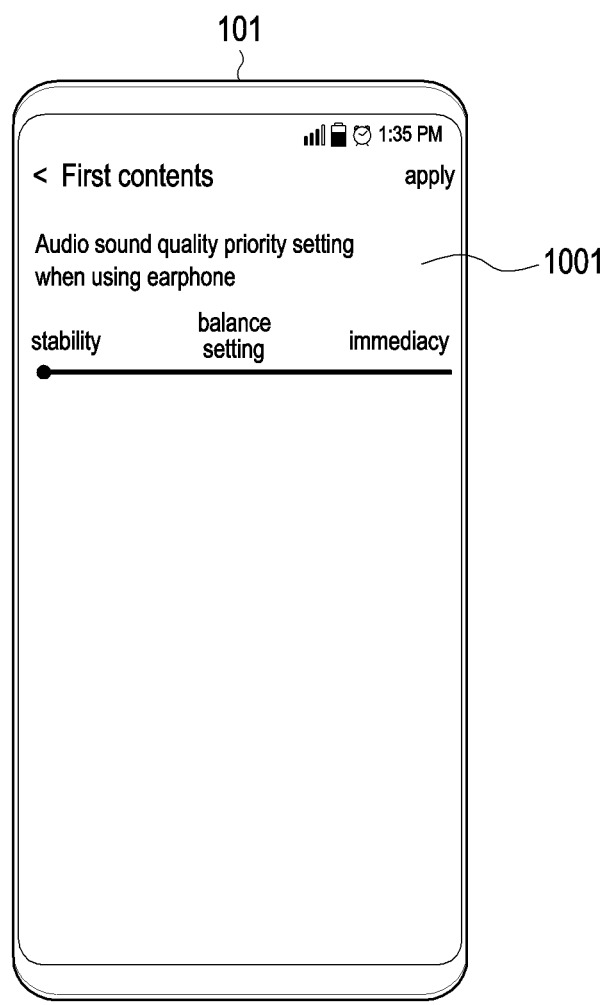
FIG. 10 is a diagram illustrating an example of a screen of an electronic device for controlling a buffer according to another embodiment.

FIG. 10 is a diagram illustrating an example of a screen of an electronic device for controlling a buffer according to another embodiment.

Referring to FIG. 10, an electronic device 101 may display a setting screen 1001 for setting information for controlling a buffer of an external electronic device (e.g., an external electronic device 102 in FIG. 2) on a display (e.g., a display device 160 in FIG. 1). The electronic device 101 may display objects which may set an audio sound quality priority of the external electronic device 102 for each contents (or an application) on the setting screen 1001. Here, the application displayed on the setting screen 1001 of the electronic device 101 may be an application related to a wearable device. Audio sound quality priority setting may be used as information related to adjustment of a size of a buffer of the external electronic device 102. The setting screen 1001 may be configured to allow a user to directly input and set information. For example, if "stability" is selected as the audio sound quality priority setting for first contents (or a first application) on the setting screen 1001 by the user's input, the electronic device 101 may set information related to the adjustment of the size of the buffer as control information for increasing the size of the buffer (e.g., for changing the size of the buffer to a first buffer size). For another example, if "immediacy" is selected as the audio sound quality priority setting for the first contents (or the first application) on the setting screen 1001 by the user's input, the electronic device 101 may set the information related to the adjustment of the size of the buffer as control information for decreasing the size of the buffer (e.g., for changing the size of the buffer to a second buffer size). For still another example, if "balance setting" is selected as the audio sound quality priority setting for the first contents (or the first application) on the setting screen 1001 by the user's input, the electronic device 101 may set the information related to the adjustment of the size of the buffer as control information for maintaining a default buffer size which is set in the external electronic device 102 or changing the size of the buffer to the default buffer size (e.g., for changing the size of the buffer to a third buffer size which is less than the first buffer size and greater than the second buffer size).

According to another embodiment, for example, if a problem occurs when the external electronic device 102 performs an operation for adjusting the size of the buffer according to the audio sound quality priority setting (e.g., the balance setting) which is selected on the setting screen 1001, the electronic device 101 may induce the user to select another audio sound quality priority setting (e.g., the stability) by displaying information related to occurrence of the problem via a current setting screen displayed on the display or another screen. As another example, if the problem occurs, the electronic device 101 may automatically change the audio sound quality priority setting to another audio sound quality priority setting (e.g., the stability). As another example, if the problem continuously occurs when an operation for adjusting the size of the buffer is performed in the external electronic device 102 according to the audio sound quality priority setting which is selected on the setting screen 1001, the electronic device 101 may automatically change the audio sound quality priority setting to another audio sound quality priority setting, and then change to audio sound quality priority setting which has been previously selected after determined time.

Figure 11:
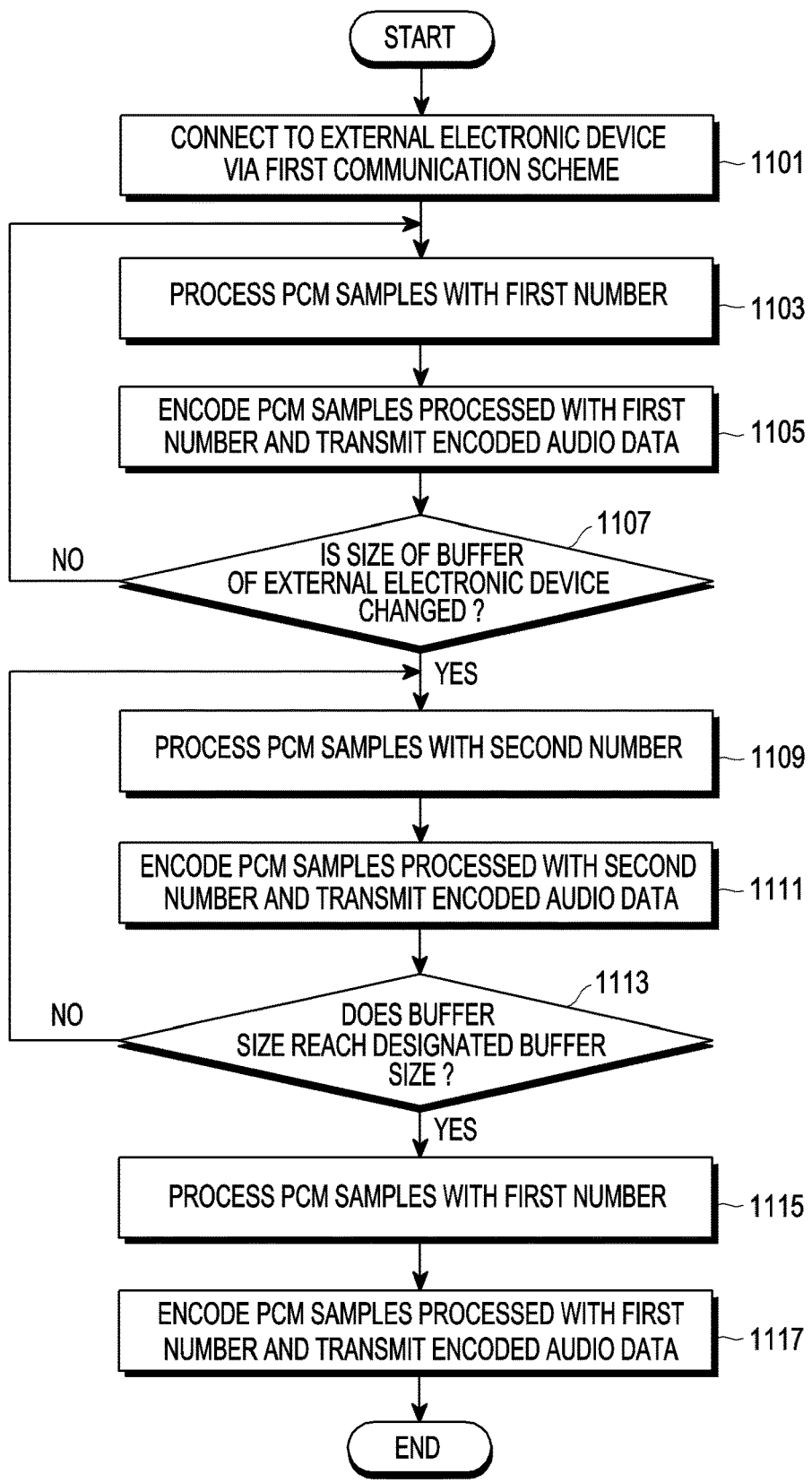
FIG. 11 is a diagram illustrating an example of an operation procedure for controlling a buffer in an electronic device according to another embodiment.
Figure 12:
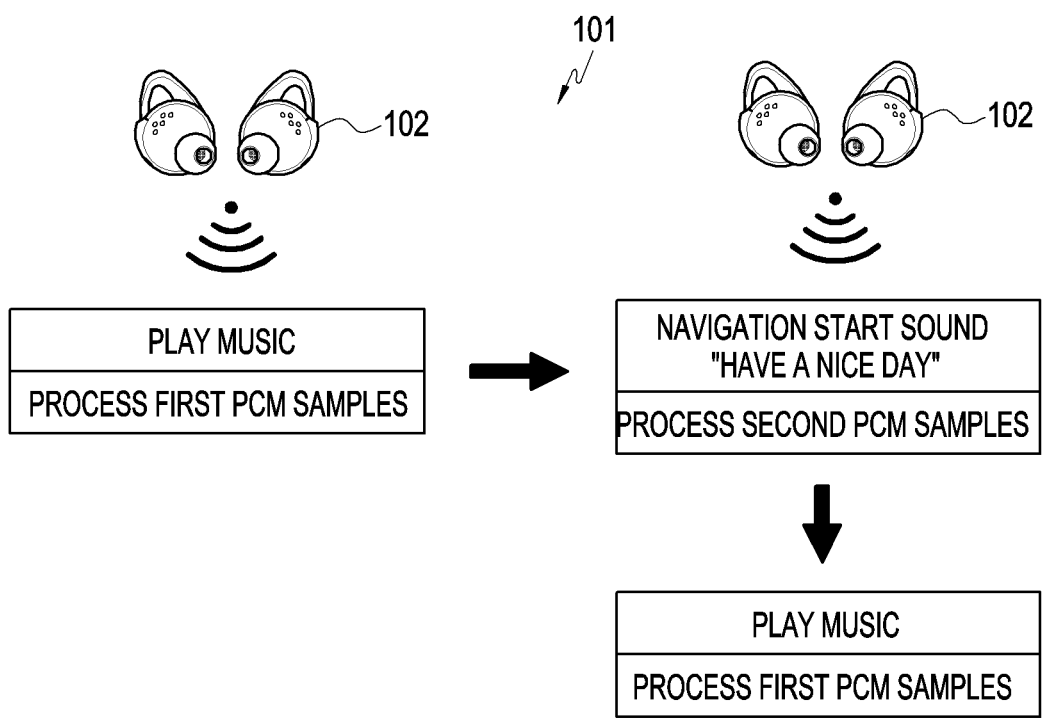
FIG. 12 is a diagram illustrating an example of an operation procedure for controlling a buffer in an electronic device according to another embodiment.

FIG. 11 is a diagram illustrating an example of an operation procedure for controlling a buffer in an electronic device according to another embodiment, and FIG. 12 is a diagram illustrating an example of an operation procedure for controlling a buffer in an electronic device according to another embodiment.

Referring to FIGS. 11 and 12, in operation 1101, according to another embodiment, an electronic device 101 (e.g., an electronic device 101 in FIGS. 1 and 2) may be connected to an external electronic device 102 (e.g., an external electronic device 102 in FIGS. 1 to 3) via a first communication scheme (e.g., a Bluetooth communication).

In operation 1103, the electronic device 101 (e.g., a first electronic device 101 in FIGS. 1 and 2) may run a first application (or first contents), obtain an audio source of the run first application, and process obtained audio source as a first number of PCM samples (e.g., first PCM samples). For example, as shown in FIG. 12, the first application may be an application which provides music.

In operation 1105, the electronic device 101 may encode the first number of PCM samples (e.g., the first PCM samples), and transmit encoded audio data to the external electronic device 102 (e.g., the external electronic device 102 in FIGS. 1 and 2) via the first communication scheme (e.g., the Bluetooth communication).

In operation 1107, as a second application (e.g., a navigation application) is run while the first application is being run, the electronic device 101 may identify whether a size of a buffer of the external electronic device 102 is changed based on information related to a buffer size. If it is identified that the size of the buffer is changed, operation 1109 may be performed, and if it is identified that the size of the buffer is not changed, operation 1103 may be performed again. For example, the electronic device 101 may compare buffer size information (e.g., 500 ms) set for the first application which is the information related to the buffer size with buffer size information (e.g., 100 ms) set for the second application which is the information related to the buffer size, and identify that the size of the buffer is changed if the buffer size information set for the first application is different from the buffer size information set for the second application. For another example, the first electronic device 101 may identify whether the size of the buffer is changed based on information inputted by a user as the information related to the buffer size. For example, if the second application which is the navigation application 1203 as shown in FIG. 12 requires a real time characteristic, there is a need to decrease latency, so the electronic device 101 may perform an operation for changing the size of the buffer of the external electronic device 102 so that the size of the buffer is decreased.

In operation 1109, as it is identified that the size of the buffer is changed, the electronic device 101 may set a processing number of the PCM samples of an audio source to a second number of PCM samples (e.g., a number decreased from the first number of PCM samples) based on the identified information related to the buffer size, and process PCM samples with the set second number of PCM samples.

In operation 1111, the electronic device 101 may encode PCM samples (e.g., second PCM samples) which are processed with the second number of PCM samples. In operation 1111, the electronic device 101 may transmit audio data (e.g., a navigation start sound ("Have a nice day")) for encoded PCM samples (e.g., second PCM samples) to the external electronic device 102. The external electronic device 102 may decode received audio data and output decoded PCM samples as they are without additionally changing the processing number for PCM samples. For example, the electronic device 101 processes PCM samples (first PCM samples or second PCM samples) with the second number of PCM samples. As amount of audio data (e.g., audio data in which music play audio and navigation audio are mixed) which is received from the electronic device 101 in the external electronic device 102 as shown in FIG. 12 is decreased, the size of the buffer of the external electronic device 102 may be automatically changed (increased or decreased). Here, the first PCM samples may be, for example, PCM samples of audio data according to music play, and the second PCM samples may be, for example, PCM samples of audio data for navigation (e.g., the navigation start sound).

In operation 1113, the electronic device 101 may identify whether the size of the buffer reaches the second buffer size (e.g., 100 ms) which is the buffer size information set for the second application. If it is identified that the size of the buffer reaches the second buffer size (e.g., 100 ms), the electronic device 101 may perform operation 1115. If it is identified that the size of the buffer does not reach the second buffer size (e.g., 100 ms), the electronic device 101 may continuously process PCM samples of the audio source with the second number of PCM samples by performing operations 1109 to 1111.

In operation 1115, if the size of the buffer reaches the second buffer size (e.g., 100 ms), the electronic device 101 may process PCM samples (e.g., first PCM samples and second PCM samples) of the audio source as shown in FIG. 12 with the first number of PCM samples.

In operation 1117, the electronic device 101 may encode PCM samples (e.g., first PCM samples and second PCM samples) which are processed with the first number of PCM samples, and transmit encoded audio data (e.g., audio data in which music play audio and navigation audio are mixed) to the external electronic device 102.

Figure 13:
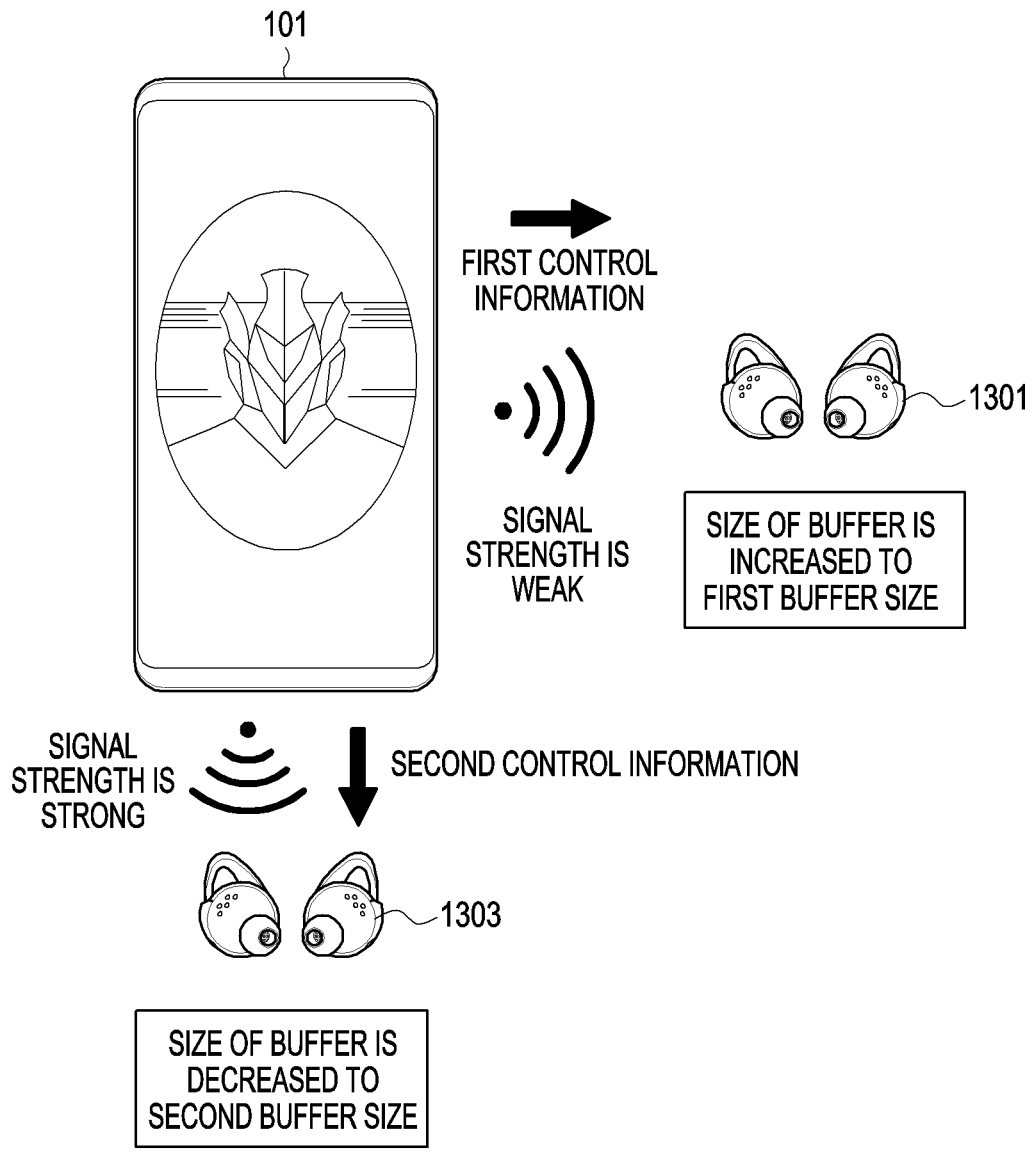
FIG. 13 is a diagram illustrating an example of an operation procedure for controlling a buffer in an electronic device and a plurality of external electronic devices according to another embodiment.

FIG. 13 is a diagram illustrating an example of an operation procedure for controlling a buffer in an electronic device and a plurality of external electronic devices according to another embodiment.

Referring to FIG. 13, according to another embodiment, when a plurality of external electronic devices 1301 and 1303 (e.g., an external electronic device 102 in FIG. 1) are connected to an electronic device 101, signal strength or communication quality may be different according to a distance between the electronic device 101 and each of the external electronic devices 1301 and 1303, and an object which is located between the electronic device 101 and each of the external electronic devices 1301 and 1303, so the electronic device 101 may obtain and manage information related to signal strength or communication quality of a communication between the electronic device 101 and each of the external electronic devices 1301 and 1303. For example, if the signal strength or communication quality is less than or equal to a reference value based on information related to the signal strength or communication quality, there is a high probability that audio interruption or noise occurs, so the electronic device 101 may set first control information for increasing a size of a buffer (e.g., the buffer 301 in FIG. 3) as information related to a buffer size to in order to increase stability. For another example, if the signal strength or communication quality is greater than or equal to the reference value, there is a low probability that the audio interruption or noise occurs, so the electronic device 101 may set second control information for decreasing the size of the buffer as the information related to the buffer size to in order to increase immediacy.

The electronic device 101 may transmit the set information related to the buffer size to each of the external electronic devices 1301 and 1303, and each of the external electronic devices 1301 and 1303 may set a designated buffer size which corresponding to the signal strength or communication quality based on the received information related to the buffer size. For example, if the external electronic device 1301 receives, from the electronic device 101, the first control information for increasing the size of the buffer as the information related to the buffer size as signal strength (or communication quality) of a communication link between the external electronic device 1301 and the electronic devices 101 is strong, the external electronic device 1301 may set a first buffer size (e.g., 500 ms) as the designated buffer size, and adjust the size of the buffer so that a current buffer size (e.g., 100 ms) is gradually increased to the set first buffer size (e.g., 500 ms). For example, if the external electronic device 1303 receives, from the electronic device 101, the second control information for decreasing the size of the buffer as the information related to the buffer size as signal strength (or communication quality) of a communication link between the external electronic device 1303 and the electronic devices 101 is weak, the external electronic device 1303 may set a second buffer size (e.g., 100 ms) as the designated buffer size, and adjust the size of the buffer so that a current buffer size (e.g., 500 ms) is gradually decreased to the set second buffer size (e.g., 100 ms).

According to another embodiment, the signal strength or communication quality of the communication between the electronic device 101 and each of the external electronic devices 1301 and 1303 as described in FIG. 13 may be directly identified in each of the external electronic devices 1301 and 1303, and in this case, without receiving the information related to the buffer size from the electronic device 101, each of the external electronic devices 1301 and 1303 may adjust the size of the buffer based on the information related to the buffer size which is based on the directly identified signal strength or communication quality so that the size of the buffer is increased or decreased to the designated buffer size.

According to another embodiment, each of the external electronic devices 1301 and 1303 as shown in FIG. 13 may identify or set the designated buffer size based on the received information related to the buffer size, and change a processing number of the PCM samples which is for processing PCM samples so that the size of the buffer is adjusted based on the designated buffer size. Each of the external electronic devices 1301 and 1303 may process PCM samples with a changed processing number, correct processed PCM samples so that a pitch is maintained, and output corrected PCM samples via an audio output circuit (e.g., an audio output circuit 209a and an audio output circuit 209b in FIG. 2) so that a user may hear the corrected PCM samples. For example, if the external electronic device 1301 gradually increases the size of the buffer from the first buffer size (e.g., 100 ms) to the second buffer size (e.g., 500 ms), the external electronic device 1301 may process PCM samples which have been processed with the first number of PCM samples with a number increased from the first number of PCM samples so that the size of the buffer is increased. For another example, if the external electronic device 1303 gradually decreases the size of the buffer from the first buffer size (e.g., 500 ms) to the second buffer size (e.g., 100 ms), the external electronic device 1303 may process PCM samples which have been processed with the first number of PCM samples with a number decreased from the first number of PCM samples so that the size of the buffer is decreased.

According to another embodiment, each of the external electronic devices 1301 and 1303 as shown in FIG. 13 may perform an operation of gradually adjusting the size of the buffer (e.g., the buffer 301 in FIG. 3) so that the size of the buffer is changed to the designated buffer size without changing the processing number for PCM samples, decode audio data outputted from the buffer whose size is being adjusted via a decoder (e.g., a decoder 303 in FIG. 3), and output decoded PCM samples via the audio output circuit (e.g., the audio output circuit 102a and the audio output circuit 120b in FIG. 2). According to another embodiment, as described in FIG. 11, the electronic device 101 may process PCM samples with a changed processing number so that the size of the buffer of each of the external electronic devices 1301 and 1303 is changed, and output PCM samples which are processed with the changed processing number to the external electronic device 1301 or 1303. The external electronic device 1301 or 1303 may receive the PCM samples which are processed with the changed processing number, and the size of the buffer may be changed in response to a fact that amount of the received PCM samples is changed. For example, if it is identified that communication quality (or signal strength) of a communication link between the first electronic device 101 and the external electronic devices 1301 is good, the first electronic device 101 may process PCM samples for audio data to be transmitted to the external electronic devices 1301 with an increased processing number and output PCM samples which are processed with the increased processing number. The external electronic device 1301 receives PCM samples whose amount is increased as the processing number of the PCM samples is increased, so the size of the buffer of the external electronic device 1301 may gradually be increased to the first buffer size (e.g., 500 ms). For example, if it is identified that communication quality (or signal strength) of a communication link between the first electronic device 101 and the external electronic devices 1303 is poor, the first electronic device 101 may process PCM samples for audio data to be transmitted to the external electronic devices 1303 with a decreased processing number and output PCM samples which are processed with the decreased processing number. The external electronic device 1303 receives PCM samples whose amount is decreased as the processing number of the PCM samples is decreased, so the size of the buffer of the external electronic device 1303 may gradually be decreased to the second buffer size (e.g., 100 ms).

A method for controlling a buffer (e.g., a buffer 301 in FIG. 3) in an electronic device (e.g., an external electronic device 102 in FIGS. 1 to 3) according to an embodiment may include connecting to an external electronic device (e.g., an electronic device 101 in FIGS. 1 to 3) with a first communication scheme, storing audio data which is received from the external electronic device (e.g., the electronic device 101 in FIGS. 1 to 3) in a buffer, processing pulse code modulation (PCM) samples which are obtained by decoding audio data outputted from the buffer with a first number of PCM samples, and outputting the PCM samples which are processed with the first number of PCM samples, in response to receiving a request for adjusting a size of the buffer from the external electronic device, changing a processing number of the PCM samples from the first number of PCM samples to a second number of PCM samples, in response to the change in the processing number of the PCM samples to the second number of PCM samples, processing PCM samples which are obtained by decoding audio data outputted from the buffer with the second number of PCM samples while the size of the buffer is adjusted, and outputting the PCM samples which are processed with the second number of PCM samples, and when the size of the buffer being adjusted reaches a designated buffer size, processing PCM samples which are obtained by decoding audio data outputted from the buffer with the first number of PCM samples, and outputting the PCM samples which are processed with the first number of PCM samples.

According to an embodiment, the method may further include correcting the PCM samples which are processed with the second number of PCM samples so that a pitch is maintained.

According to an embodiment, the method may further include receiving information related to the size of the buffer from the external electronic device when receiving the request for adjusting the size of the buffer from the external electronic device, and identifying the designated buffer size based on the information related to the size of the buffer. The information related to the size of the buffer may include at least one of information about the designated buffer size, information about a type of an application run on the external electronic device, or information about communication quality.

According to an embodiment, the method may further include transmitting information related to a state of the buffer to the external electronic device.

According to an embodiment, the first communication scheme may be a Bluetooth communication.

As is apparent from the foregoing description, according to an electronic device and an operation method in the electronic device according to an embodiment, latency may be optimized by controlling an optimal buffer size per scenario when audio data is processed, thereby preventing sound interruption or noise and improving sound quality.

According to an electronic device and an operation method in the electronic device according to an embodiment, sound interruption or a change in sound quality may be prevented via correction so that there is no change in a mute period or a pitch while a buffer size is adjusted.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

A storage medium which is readable by a machine (e.g., an electronic device 101) may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, or flash memories. Examples of the program instructions may include not only machine language codes but also high-level language codes which are executable by various computing means by using an interpreter. The aforementioned hardware devices may be configured to operate as one or more software modules to carry out exemplary embodiments of the disclosure, and vice versa.

According to an embodiment, a non-transitory storage medium (e.g., a memory 201*a* or 201*b* in FIG. 2) may include an executable instruction which, when executed by a processor (e.g., a processor 205*a* or 205*b* in FIG. 2), cause the processor to perform connecting to an external electronic device (e.g., an electronic device 101 in FIG. 1 or FIG. 2) using a first communication scheme, storing audio data received from the external electronic device in a buffer (e.g., a buffer 301 in FIG. 3), processing pulse code modulation (PCM) samples with a first number of the PCM samples, and outputting the PCM samples which are processed with the first number, the PCM samples are obtained by decoding audio data output from the buffer, in response to receiving a request for adjusting a size of the buffer from the external electronic device, changing a processing number of PCM samples from the first number of PCM samples to a second number of PCM samples, in response to the change in the processing number of PCM samples to the second number of PCM samples, processing PCM samples which are obtained by decoding audio data outputted from the buffer with the second number of PCM samples while the size of the buffer is adjusted, and outputting the PCM samples which are processed with the second number of PCM samples, and when the size of the buffer being adjusted reaches a designated buffer size, processing PCM samples which are obtained by decoding the audio data outputted from the buffer with the first number of PCM samples, and outputting the PCM samples which are processed with the first number of PCM samples.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
a communication circuit;
a memory including a buffer;
an audio output circuit; and
a processor electrically connected to the communication circuit, the memory, and the audio output circuit,
wherein the processor is configured to:
control the communication circuit to connect to an external electronic device with a first communication scheme;
control the memory to store, in the buffer having a first buffer size, audio data received from the external electronic device via the communication circuit;
process pulse code modulation (PCM) samples obtained by decoding the audio data output from the buffer having the first buffer size, with a first number of PCM samples, and control the audio output circuit to output the PCM samples which are processed with the first number of PCM samples;
in response to receiving a request for adjusting a size of the buffer from the external electronic device, change a processing number of PCM samples from the first number of PCM samples to a second number of PCM samples;
in response to the change in the processing number of PCM samples to the second number of PCM samples, process PCM samples obtained by decoding audio data output from the buffer, with the second number of PCM samples, and control the audio output circuit to output the PCM samples which are processed with the second number of PCM samples; and
based on the size of the buffer being changed from the first buffer size to a second buffer size, process PCM samples obtained by decoding the audio data output from the buffer, with the first number of PCM samples, and control the audio output circuit to output the PCM samples which are processed with the first number of PCM samples.

2. The electronic device of claim 1, wherein the processor is further configured to correct the PCM samples which are processed with the second number of PCM samples so that a pitch is maintained,
wherein the electronic device is an earphone or an ear bud as an audio sink device, and
wherein the size of the buffer is increased or decreased stepwise while processing the PCM samples obtained by decoding the audio data output from the buffer with the second number of PCM samples.

3. The electronic device of claim 1, wherein the processor is configured to:
receive information related to the size of the buffer from the external electronic device when receiving the request for adjusting the size of the buffer from the external electronic device; and
identify the second buffer size based on the information related to the size of the buffer.

4. The electronic device of claim 3, wherein the information related to the size of the buffer includes at least one of information about the second buffer size, information about a type of an application run on the external electronic device, or information about communication quality.

5. The electronic device of claim 1, wherein the processor is configured to control the communication circuit to transmit information related to a state of the buffer to the external electronic device.

6. The electronic device of claim 1, wherein the first communication scheme is a Bluetooth communication.

7. The electronic device of claim 1, wherein the processor is further configured to:
connect to a secondary device via the first communication scheme when the electronic device performs a role of a primary device;
transmit the audio data which is received from the external electronic device to the secondary device; and
in response to receiving the request for adjusting the size of the buffer, control the communication circuit to transmit information about the changed second number of PCM samples and information about the second buffer size to the secondary device,
wherein the buffer is synchronized with a buffer of the secondary device.

8. An electronic device, comprising:
a communication circuit;
a memory;
an audio processing circuit; and
a processor electrically connected to the communication circuit, the memory, and the audio processing circuit,
wherein the processor is configured to:
control the communication circuit to connect to an external electronic device using a first communication scheme;
control the audio processing circuit to process pulse code modulation (PCM) samples for an audio source with a first number of PCM samples;
control the communication circuit to transmit, to the external electronic device, audio data which is generated by encoding the PCM samples which are processed with the first number of PCM samples;
in response to identifying occurrence of an event for controlling a buffer of the external electronic device,
control the audio processing circuit to process PCM samples for the audio source with a second number of PCM samples
control the communication circuit to transmit, to the external electronic device, audio data which is generated by encoding the PCM samples which are processed with the second number of PCM samples; and
based on a size of the buffer of the external electronic device being changed from a first buffer size to a second buffer size, control the communication circuit to transmit, to the external electronic device, audio data which is generated by encoding PCM samples which are processed with the first number of PCM samples.

9. The electronic device of claim 8, wherein the processor is further configured to correct the PCM samples which are processed with the second number of PCM samples so that a pitch is maintained,
wherein the external electronic device is an earphone or an ear bud as an audio sink device, and
wherein the size of the buffer is increased or decreased stepwise while processing the PCM samples obtained by decoding the audio data output from the buffer with the second number of PCM samples.

10. The electronic device of claim 8, wherein the processor is further configured to:
obtain information related to the size of the buffer; and
identify the second buffer size based on the information related to the size of the buffer.

11. The electronic device of claim 8, wherein the processor is configured to identify that the event occurs when contents which generate the audio source are changed.

12. The electronic device of claim 8, wherein the processor is configured to identify that the event occurs when communication quality between the electronic device and the external electronic changes.

13. The electronic device of claim 8, further comprising:
a display,
wherein the processor is configured to identify that the event occurs when information related to at least one buffer size which is displayed on the display is selected by a user.

14. The electronic device of claim 8, wherein the first communication scheme is a Bluetooth communication.

15. A method for controlling a buffer in an electronic device, the method comprising:
connecting to an external electronic device using a first communication scheme;
storing, in the buffer having a first buffer size, audio data received from the external electronic device via a communication circuit;
processing pulse code modulation (PCM) samples obtained by decoding the audio data output from the buffer having the first buffer size, with a first number of PCM samples, and outputting the PCM samples which are processed with the first number of PCM samples;
in response to receiving a request for adjusting a size of the buffer from the external electronic device, changing a processing number of PCM samples from the first number of PCM samples to a second number of PCM samples;
in response to the change in the processing number of PCM samples to the second number of PCM samples, processing PCM samples obtained by decoding audio data output from the buffer with the second number of PCM samples, and outputting the PCM samples which are processed with the second number of PCM samples; and based on the size of the buffer being changed from the first buffer size to a second buffer size, processing PCM samples obtained by decoding audio data output from the buffer with the first number of PCM samples, and outputting the PCM samples which are processed with the first number of PCM samples.

16. The method of claim 15, further comprising:
correcting the PCM samples which are processed with the second number of PCM samples so that a pitch is maintained,
wherein the electronic device is an earphone or an ear bud as an audio sink device, and
wherein the size of the buffer is increased or decreased stepwise while processing the PCM samples obtained by decoding the audio data output from the buffer with the second number of PCM samples.

17. The method of claim 15, further comprising:
receiving information related to the size of the buffer from the external electronic device when receiving the request for adjusting the size of the buffer from the external electronic device; and
identifying the second buffer size based on the information related to the size of the buffer.

18. The method of claim 17, wherein the information related to the size of the buffer includes at least one of information about the second buffer size, information about a type of an application run on the external electronic device, or information about communication quality.

19. The method of claim 15, further comprising:
transmitting information related to a state of the buffer to the external electronic device.

20. The method of claim 15, wherein the first communication scheme is a Bluetooth communication.

* * * * *